US011475796B2

(12) United States Patent
Schwindt et al.

(10) Patent No.: US 11,475,796 B2
(45) Date of Patent: Oct. 18, 2022

(54) PATIENT SIMULATOR

(71) Applicant: SIMCharacters GmbH, Vienna (AT)

(72) Inventors: Jens Christian Schwindt, Pressbaum (AT); Ewald Ungar, Vienna (AT); Michael Haller, Vienna (AT); Tanja Nepomucky, Vienna (AT); Martin Schmoll, Vienna (AT)

(73) Assignee: SIMCHARACTERS GMBH, Vienna (AT)

( * ) Notice: Subject to any disclaimer, the term of this patent is extended or adjusted under 35 U.S.C. 154(b) by 548 days.

(21) Appl. No.: 16/315,013

(22) PCT Filed: Jun. 28, 2017

(86) PCT No.: PCT/AT2017/000053
§ 371 (c)(1),
(2) Date: Jan. 3, 2019

(87) PCT Pub. No.: WO2018/006107
PCT Pub. Date: Jan. 11, 2018

(65) Prior Publication Data
US 2019/0259304 A1    Aug. 22, 2019

(30) Foreign Application Priority Data
Jul. 5, 2016     (AT) .................................. A 317/2016

(51) Int. Cl.
*G09B 23/28*     (2006.01)
*A63H 13/02*     (2006.01)
(Continued)

(52) U.S. Cl.
CPC ........... *G09B 23/288* (2013.01); *A63H 3/001* (2013.01); *A63H 3/003* (2013.01); *A63H 13/005* (2013.01); *A63H 13/02* (2013.01); *G09B 23/285* (2013.01)

(58) Field of Classification Search
CPC .... G09B 23/285; G09B 23/288; G09B 23/30; G09B 23/32; A63H 3/001; A63H 3/003; A63H 13/005; A63H 13/02
(Continued)

(56) References Cited

U.S. PATENT DOCUMENTS

| 3,520,071 A | 7/1970 | Stephen et al. |
| 4,850,876 A | 7/1989 | Lutaenko |

(Continued)

FOREIGN PATENT DOCUMENTS

| EP | 1687790 A2 | 8/2006 |
| FR | 519188 A | 6/1921 |

(Continued)

OTHER PUBLICATIONS

International Search Report received in PCT/AT2017/000053 dated Oct. 16, 2017, pp. 21.

*Primary Examiner* — Joseph B Baldori
(74) *Attorney, Agent, or Firm* — Liang & Hennessey LLP; Brian Hennessey

(57) ABSTRACT

In a patient simulator, in particular a premature baby, newborn or child simulator, including a simulated thorax, a pneumatic lung simulator and a simulated trachea leading to the lung simulator, wherein the simulated thorax includes a simulated chest including at least one liftable and lowerable chest element to simulate lifting and lowering of the chest, the at least one liftable and lowerable chest element cooperates with a lifting and lowering mechanism actuatable independently of the lung simulator.

28 Claims, 16 Drawing Sheets

(51) Int. Cl.
*A63H 3/00* (2006.01)
*A63H 13/00* (2006.01)

(58) Field of Classification Search
USPC .................. 434/265, 266, 267, 272, 274
See application file for complete search history.

(56) References Cited

U.S. PATENT DOCUMENTS

| | | | | |
|---|---|---|---|---|
| 5,055,052 | A * | 10/1991 | Johnsen | G09B 23/288 |
| | | | | 434/265 |
| 5,584,701 | A | 12/1996 | Lampotang | |
| 10,460,625 | B2 * | 10/2019 | Tessier | G09B 23/288 |
| 2008/0138779 | A1 | 6/2008 | Eggert | |
| 2010/0279262 | A1 | 11/2010 | Lecat | |
| 2014/0302473 | A1 | 10/2014 | Nakaguchi | |
| 2016/0055767 | A1 * | 2/2016 | Tessier | G09B 23/288 |
| | | | | 434/267 |

FOREIGN PATENT DOCUMENTS

| | | |
|---|---|---|
| FR | 2965089 A | 3/2012 |
| WO | 2005032327 A1 | 4/2005 |
| WO | 2012155283 A1 | 11/2012 |
| WO | 2015161337 A1 | 4/2015 |
| WO | 2016/030393 A1 | 3/2016 |

\* cited by examiner

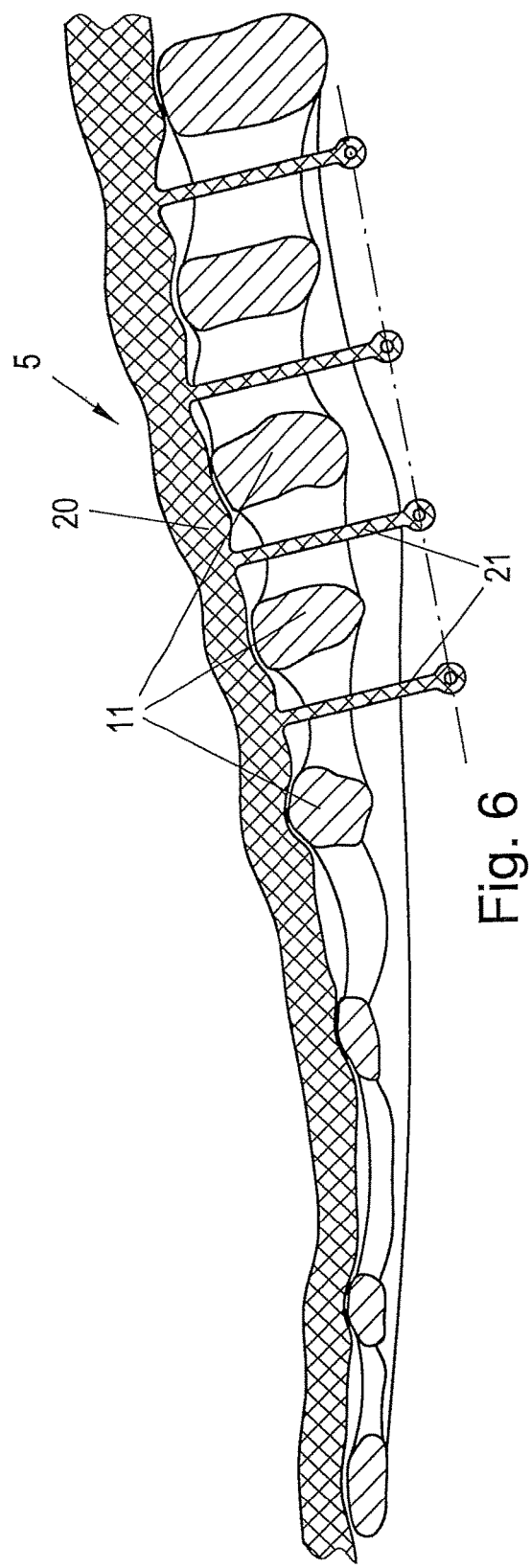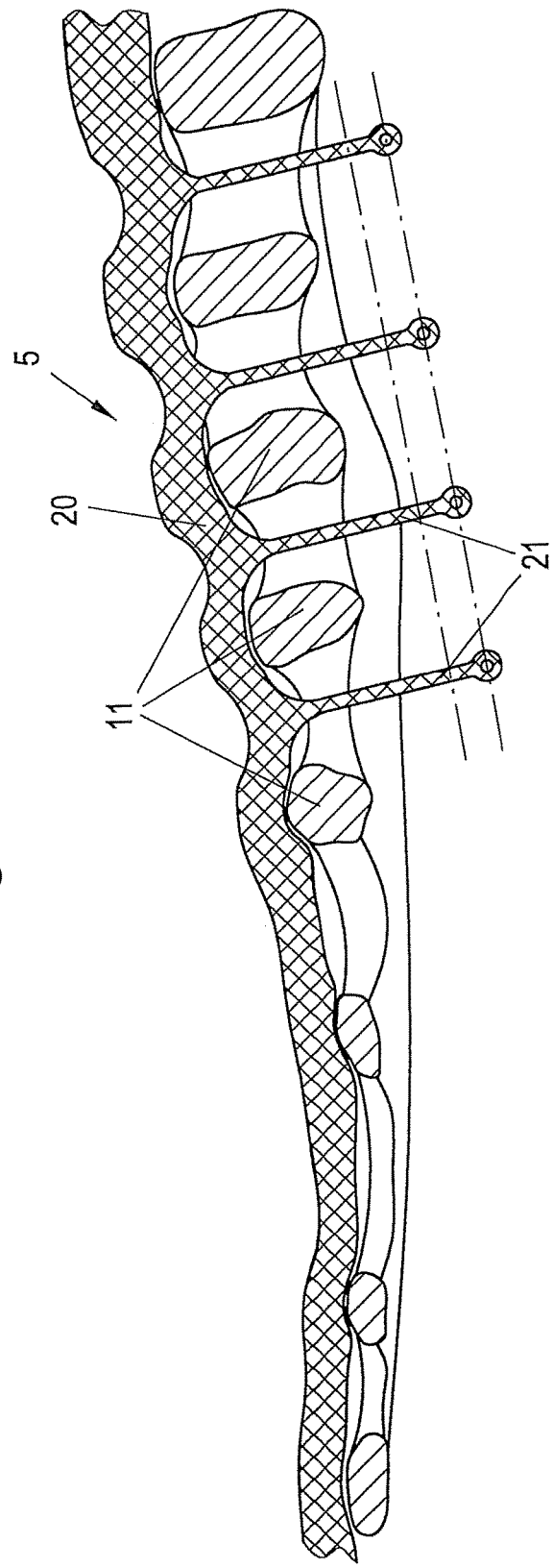

PATIENT SIMULATOR

CROSS-REFERENCE TO RELATED APPLICATIONS

This application is a national phase application of PCT Application No. PCT/AT2017/000053, filed Jun. 28, 2017, entitled "PATIENT SIMULATOR", which claims the benefit of Austrian Patent Application No. A317/2016 filed Jul. 5, 2016, each of which is incorporated by reference in its entirety.

FIELD OF THE INVENTION

The invention relates to a patient simulator, in particular a premature baby, newborn or child simulator, including the simulation of at least one body part of a human patient.

BACKGROUND

Since the treatment of a critically ill premature baby or newborn is a relatively rare event, it requires rapid, judicious and structured action of the medical personnel, which is why the implementation of medical actions and the collaboration within a team repeatedly involve problems. Unless the right measures are taken in the treatment of a life-threatened premature baby or newborn, this may have a life-long impact on the further development of the infant. The performance of simulation trainings is thus an ethical obligation, above all, in pediatrics. It is only in this way that the necessary experiences and skills for the treatment of critically ill premature babies or newborns can be acquired without jeopardizing the lives or health of the patients. The quality standards of contemporary medicine also require the training of rare events in order to save lives, on the one hand, and to improve the quality of life after an emergency situation, on the other hand.

Currently available infant and or newborn manikins do not allow the simulations of a number of pathologies due to their small sizes and the thus required miniaturization of technological and control elements. Moreover, such simulation manikins frequently lack truth of reality, for which reason manipulations performed on the manikin will not automatically improve activities in reality.

WO 2012/155283A1 describes a lung simulator equipped with at least one air chamber formed, for instance by silicone bellows to optimally simulate the function of the lung in health and disease. The lung model disclosed in WO 2012/155283A1 involves the drawback of being not arrangeable within a realistic simulator (manikin) because of its size, but rather located outside the manikin.

SUMMARY

The present invention, therefore, aims to improve a patient simulator, in particular a premature baby simulator, to the effect that the truth to reality will be enhanced and the simulation of various pathological states will be enabled even with small-structured configurations for premature baby simulation.

To solve this object, the invention according to a first aspect provides a patient simulator, in particular a premature baby, newborn or child simulator, including a simulated thorax, a lung simulator and a simulated trachea leading to the lung simulator, wherein the simulated thorax includes a simulated chest including at least one liftable and lowerable chest element to simulate lifting and lowering of the chest, wherein the at least one liftable and lowerable chest element cooperates with a lifting and lowering mechanism actuatable independently of the lung simulator.

The invention is thus based on configuring the lung simulator and the simulation of the lifting and lowering of the thorax as functionally separate units to be actuated separately in order to perform simulation operations. In this respect, a lung simulator is meant to denote a simulation of the fundamental breath-mechanical parameters of a human, such as, in particular, the flow resistance of the airways (resistance) and the distensibility of the lung (compliance). In the simplest case, a lung simulator comprises a pneumatic series connection of resistance and compliance. The lung simulator serves to simulate various states of a patient's lung, e.g. in terms of resistance and compliance, which is, in particular, of great advantage for practicing mechanical respiration or ventilation by the aid of a patient simulator on real breathing apparatus. In order to enable an endotracheal intubation in this context, the patient simulator according to the invention comprises a simulated trachea leading to the lung simulator, and preferably a simulated anatomical larynx.

Conventional configurations of patient simulators comprise a pneumatic lung model, usually an elastic hollow body, which is connected to a spontaneous breathing pressure source to periodically fill and empty the hollow body according to the simulated respiration, thus periodically expanding and contracting the hollow body. The simulated thorax in conventional configurations is provided with a liftable and lowerable chest element below which the elastic hollow body of the lung simulator is disposed so as to effect lifting of the chest by the pressure of the expanding hollow body and lowering of the chest by the elastic restoration of the chest element or hollow body. The movement of the chest is thus directly coupled to the spontaneous breathing simulation and respiration of the lung simulator.

By contrast, the lifting and lowering of the chest in the configuration according to the invention can be simulated independently of the instantaneous state of the lung simulator, since the liftable and lowerable chest element is driven by a lifting and lowering mechanism that is mechanically and physically independent of the lung simulator. The lung simulator and the lifting and lowering of the chest are thus configured as functionally separate units that can be separately actuated for performing simulation operations. This enables the simulation of not only physiologically normal states, but also various pathological states in a manner true to reality, and the provision of extended training options for trainees. In addition, it has become possible to arrange the lung simulator, or individual components thereof, at any other place than immediately below the liftable and lowerable chest element so as to facilitate a space-saving arrangement. A preferred configuration of the invention in this context provides that the lung simulator is arranged within the simulated thorax and/or within a simulated abdomen. The lung simulator, or individual components thereof, may, in particular, be arranged within the simulated abdomen.

The independent actuation of the lifting and lowering mechanism offers the additional advantage that the lifting and lowering movements can be readily represented on a graphical user interface displayed on the monitor of an appliance such as a personal computer. The graphical user interface in this case preferably comprises a graphical representation of the simulated patient, wherein the graphical user interface cooperates with the patient simulator, or a control device actuating the same, in such a manner that the graphical user interface displays the lifting and the lowering of the chest of the represented patient, which are synchronous with the lifting and the lowering of the chest induced by the lifting and lowering mechanism of the patient simulator.

To simulate physiologically normal states of the respiratory system, in particular the lung, the lifting and lowering mechanism of the simulated thorax is actuated such that the at least one liftable and lowerable chest element will rise and fall synchronously with the air filling and emptying of the lung simulator. This is, in particular, the case when performing respiration exercises on the patient simulator, such as respiration exercises with masks and anesthesia bags. In this case, the simulator can preferably be ventilated with the head in the neutral position and the respiration mask correctly sealed. When the thorax is subsequently lifted on the simulator, the user will recognize (according to reality) that it does actually ventilate. For the technical implementation of such a simulation, it is preferably provided that the lung simulator comprises at least one cavity, preferably two cavities, namely one for simulating the right lung and one for simulating the left lung, which can be filled with air from a respirator—preferably via the simulated trachea, wherein pressure sensors for measuring the pressure in the cavity/ies are provided. The signals of the pressure sensor(s) are preferably fed to a control device for actuating the lifting and lowering mechanism of the simulated thorax so as to lift and lower the at least one liftable and lowerable chest element as a function of the pressure signals. The pressure sensors are preferably arranged and configured to detect the respiratory pressure and the respiration volume. To this end, the at least one cavity of the lung simulator, which is preferably designed as a rigid-wall cavity, is preferably configured to be adjustable in volume. The volume can be dynamically adapted according to the physical principles of compliance and resistance. The calculation of the current volume is, for instance, based on an adapted algorithm within a microcontroller. An electric drive is preferably provided for adjusting the physiological and pathological breathing parameters of the lung simulator.

Alternatively, the lung can also be passively designed. To this end, the chamber is flexibly configured, for instance as a chamber with an opened side spanned by a flexible membrane. The expansion of the membrane as a function of the respiratory pressure allows for the simulation of the tidal volume. The compliance of the lung can be adapted to an equivalent comparable in reality by selecting the thickness, the material, or the adjustability of the tension, of the membrane.

In connection with the simulation of pathological states, the respiratory distress syndrome is of particular relevance. The respiratory distress syndrome renders the effective respiration and ventilation of the lung difficult. Due to the negative pressure in the lung, which can hardly be filled with air, the diaphragm is drawn towards the thorax. The chest hardly rises and apparently falls during tensioning of the diaphragm. Thus, the impression of inverted or paradoxical breathing is created, since the chest falls during inspiration and apparently rises during expiration. This impression is even intensified by the reverse movement of the abdomen. The simulation of inverted breathing in the context of the invention is enabled by the lung-simulator-independent control of the lifting and lowering mechanism of the at least one liftable and lowerable chest element, wherein the control unit of the lifting and lowering mechanism is arranged to lift the at least one chest element during simulated expiration, and to lower the at least one chest element during simulated inspiration. In addition, it may be provided that a simulated abdomen of the patient simulator comprises a liftable and lowerable abdominal plate driven by a lifting and lowering mechanism of the simulated abdomen. The optical impression of inverted breathing in this case is achieved in that the abdominal plate is lifted during inspiration while the chest falls at the same time, and the abdominal plate falls during expiration while the chest rises at the same time.

Furthermore, the patient simulator according to the invention enables the simulation of pneumothorax. Pneumothorax is a feared complication in a not fully developed premature baby. In this case, a rupture of the lung and hence an acute emergency situation may occur. This will be recognized in that the chest will no longer rise on the respective side. A preferred configuration for the simulation of pneumothorax in this respect provides that at least one right liftable and lowerable chest element for the right hemithorax and at least one left liftable and lowerable chest element for the left hemithorax are provided, which are designed to be liftable and lowerable separately from each other and each cooperate with a separate, actuatable lifting and lowering mechanism, the lifting and lowering mechanism for the right chest element and the lifting and lowering mechanism for the left chest element being actuatable independently of each other. Due to the arrangement of separate lifting and lowering mechanisms for the right and left hemithoraces, it has become possible in a simple manner to simulate pneumothorax both with auto-breathing and with any form of respiration or ventilation. To this end, only one of the two lifting and lowering mechanisms (right or left) is actuated. This results in a unilateral rise of the chest, which will be readily recognized as unilateral pneumothorax by the trainee.

A preferred configuration provides that the lifting and lowering mechanism(s) is/are disposed in the simulated thorax, in particular below the at least one liftable and lowerable chest element.

Basically, the lifting and lowering mechanism may be driven in any manner whatsoever, e.g. pneumatically, hydraulically or electrically. In a preferred manner, the lifting and lowering of the thorax element is performed by an electromotor, to which end the lifting and lowering mechanism(s) each comprises an electromotor drive unit preferably including an arm drivable for pivotal movement. The pivot arm allows for a space-saving configuration of the lifting and lowering mechanism, while at the same time enabling a lifting and lowering movement with a relatively large stroke.

Concerning the lung simulator, it is preferably provided that it comprises at least one control element for adjusting the compliance and the resistance. The lung simulator in this case may be comprised of an, in particular, rigid-wall chamber with a controllable piston defining the chamber volume and able to vary the simulated lung volume as a function of pressure and time, wherein both the compliance and the resistance can be adjusted by changing the pressure exerted on the piston. The piston is preferably pressurized by a spring element providing what is called basic compliance, i.e. the spring element causes a passive maintenance of the pressure in the lung simulator. For changing the pressurization of the piston, a spring element cooperating with the piston and the bias of which can be changed, is provided. A drive cooperating with the piston, in particular an electric motor drive or a magnetic drive, can be provided for changing the chamber volume. The drive is preferably comprised of a linear motor.

In a simplified, alternative lung control system, the biological parameters, compliance and resistance, are preferably controlled in a mutually separate manner, comprising at least a respective control element for said compliance and said resistance. In this preferred embodiment, for controlling compliance, the elasticity will be provided by differently tensioning the lung wall of the simulator. The control of the resistance of the respiratory tract is ensured independently thereof by an adjustable or high-speed valve for adjusting the air resistance.

For realizing the simulation of an improvement of the oxygenation in a surfactant deficiency syndrome after the administration of a surfactant preparation, or the simulation of such medication with a fluid, a sensor is provided in the simulated thorax, in particular in a simulated respiratory tract, preferably in the simulated trachea. The sensor is preferably exchangeably incorporated in a wall of the simulated respiratory tract and comprises a fluid-adsorbing material, in particular a foamed material, and a humidity sensor integrated in said material. The sensor will detect the injection of a fluid such as a surfactant preparation into the respiratory tract and/or the lung, by the dry material, in particular the foamed material, absorbing the fluid and hence changing its electrically conducting property. As soon as the administration of the surfactant preparation has been detected, the patient simulator will display a change in the pathological parameter and lower the compliance and resistance values of the lung simulator according to the clinical reality as a function of the time course.

In addition to the sensorial function of surfactant sensors, the sensor together with the foamed material fulfills the function of a dirt filter for the lung simulator, enabling the cleaning the respiratory tract at an exchange of the sensor by flushing with a cleaning fluid via a cleaning plug.

The exchangeable humidity sensor with a foamed core thus is integrated in the respiratory tract for detecting fluids and filtering the breathing air.

For the realistic representation of a respiratory distress syndrome, a so-called intercostal retraction of the skin can be simulated. With a respiratory distress syndrome, inspiration is impeded. Due to the negative pressure forming in the chest during inspiration, the skin and tissues are retracted into the flexible segments against the more rigid portions (skeleton). This applies, in particular, in the region of the intercostal spaces. A preferred configuration of the invention in this connection provides that the at least one liftable and lowerable thorax element comprises a plurality of simulated ribs, and the simulated thorax comprises a simulated skin covering the simulated ribs and liftable and lowerable together with the at least one liftable and lowerable chest element, wherein a tension or pressure means such as at least one thread or a rod-shaped tension element contacting the simulated skin is fastened to the at least one liftable and lowerable chest element, and wherein the at least one liftable and lowerable chest element carries a drive element, in particular an electromotor, for shifting the tension means so as to cause an intercostal retraction of the simulated skin. In that the drive element for shifting the tension means is arranged on, or fastened to, the liftable and lowerable chest element, the drive element will also be moved during the lifting and lowering movements of the chest element simulating breathing (respiration), thus enabling the simulation of the intercostal retraction to be effected independently of the current lifting position of the chest element.

In a further embodiment, the retraction may be performed by magnetic force in that magnetic elements are incorporated in the skin and magnetically attracted in a breath-synchronous manner in at least one intercostal space by electrically actuated magnetic coils.

It may, moreover, be preferably provided that the patient simulator is arranged to simulate the pathological state of necrotizing enterocolitis. Necrotizing enterocolitis (NEC) is a disorder of the intestines with a partially dramatic course, which is feared as a complication in the treatment of premature babies. In this group of patients, it constitutes the most frequent acute disease of the gastrointestinal tract with partially dramatic consequences for the premature baby. Due to a reduced blood flow (underperfusion) of the intestinal wall in connection with an infection, NEC will cause tissue debris (necrosis) in the intestinal wall. In most cases, this will occur in the region of the terminal ileum and the ascending colon, frequently involving the formation of putrefactive gases in the intestinal wall (pneumatosis intestinalis). With an increasing damage of the intestinal wall, the latter can be perforated, thus causing spillage of the intestinal contents into the free abdominal cavity. Inflammatory reactions, peritonitis and sepsis will be the consequences.

The clinical symptom of a necrotizing enterocolitis is a partially massively distended abdomen with widened intestinal loops, lacking peristaltic function and hence lacking intestinal sounds. The local infection with a spillage of the intestinal contents will lead to a livid (white, grayish, bluish) discoloration of the abdominal skin and a protrusion of the vein pattern in this region with varying severity. The distension of the intestine, and hence the entire abdomen, may sometimes result in a massive restriction of the spontaneous respiration, since the distended abdomen will press the lungs upwards into the thorax, thus compressing the same. This will frequently massively affect spontaneous breathing. Consequently, premature babies suffering from serious NEC frequently have to be acutely intubated and mechanically respirated.

For the simulation of NEC, the patient simulator is arranged to implement the subsequent operations. The simulation of the distension and induration of the abdomen is effected by lifting the abdominal plate. To this end, the abdominal plate is placed and maintained in its maximum position. When a force is exerted from outside, it is preferably provided that the drive for lifting the abdominal plate exerts an adjustable, maximum counter-force in order to simulate induration. At the same time, a reduction of the compliance of the lung is preferably effected via the physiological control circuits of the lung model. The lung volume is being reduced, and a higher respiratory pressure will be necessary for respiration. The possibly provided implementation of a discoloration of the simulator is preferably realized by colored LEDs, which illuminate the simulated skin of the simulator in the abdominal region from inside, allowing the same to shine in the required color. Such LEDs are able to mix the basic colors, red, green, blue, as per specification in order to compensate for possible discolorations in the silicone skin. In order to simulate the protruding vessel pattern, the vessels are covered by colors on the inner side of the simulated skin and/or incorporated in the wall of the simulated skin. Under the direct or diffuse light of the LEDs of the lifting plate, these simulated vessels will then be visible through the tensioned skin.

An independent, second aspect of the present invention, which can be combined with any other aspect of the invention, in this connection provides a patient simulator, in particular a premature baby simulator, comprising a lung simulator and a simulated abdomen including a liftable and lowerable abdominal plate driven by a lifting and lowering mechanism, wherein a control device is arranged to lift the abdominal plate and, at the same time, increase the respiratory resistance of the lung model. In a preferred manner, it is provided in this context that the simulated abdomen with the abdominal plate is spanned by a simulated skin whose inner side can be illuminated by lamps disposed in the simulated abdomen.

Furthermore, the patient simulator according to the invention can be arranged to simulate the symptom of "head bobbing", which is a sign of increased breathing work in premature babies and newborns. In this case, the reduced compliance of the lung leads to breath-synchronous, jerky forward movements of the head at every inspiration due to the activity of the accessory muscles of respiration in the head region (M. sternocleidomostoideus). In order to simulate this symptom, a servomotor or a comparable drive element may be provided, which changes the angle between the simulated head and the simulated thorax of the simulator via a rod assembly or a comparable flexible translation element such as a control cable. Such movement is preferably synchronized with the breathing work via the central control unit.

The technical implication of "head bobbing" is, for instance, effected via two Bowden cables extending symmetrically on the left and right sides of the simulated respiratory tract, and by the restoring force of the tensioned silicone components of the simulator.

An independent, third aspect of the present invention, which can be combined with any other aspect of the invention, in this connection provides a patient simulator, in particular a premature baby simulator, comprising a lung simulator, a simulated thorax including a liftable and lowerable chest element driven by a lifting and lowering mechanism, and a simulated head cooperating with a tilting mechanism for changing the angle between the simulated head and the simulated thorax, wherein a control device is arranged to drive the tilting mechanism for periodic tilting movements of the simulated head, said periodic tilting movements being synchronized with the lifting and lowering movements of the chest element.

According to a fourth, independent aspect of the invention, which can optionally be realized in a patient simulator according to the first, second or third aspect of the invention, a patient simulator, in particular a premature baby, newborn or child simulator, is provided, comprising a simulated head including a simulated skull covered by a simulated skin, wherein at least one light source is provided in and/or on the simulated skull. This enables the simulation of a discoloration of the skin or simulated skin in the head region. In the event of a blue discoloration, a cyanosis may, for instance, be simulated. Cyanosis implies a reduced saturation of the blood with oxygen and can be a symptom of a life-threatening disorder if occurring acutely. In physiological terms, premature babies and newborns have cyanoses in the first minutes of life following birth. This is above all manifested in the region of the head and trunk. With an increasing effectiveness of breathing, cyanosis will disappear in the first minutes of life. If it persists beyond this time, this may be an important sign of a pathological state. It may concern both the respiration and the cardiovascular functions (e.g. congenital heart defect). Furthermore, the light source can also simulate a red coloration/redness of the head, which, for instance, occurs in hyperoxia, i.e. an oversupply of oxygen and the associated increase in the oxygen partial pressure in blood. Cyanosis and hyperoxia are thus crucial clinical parameters in the treatment of a premature baby or newborn, decisively influencing the activities of the supporting team.

In that the at least one light source is disposed in and/or on the simulated skull, the light is not directly introduced into the simulated skin, which would merely cause a localized point light effect on the skin, but the light introduction into the simulated skull will ensure a light distribution there such that a larger surface area of the simulated skin will be illuminated from inside in a relatively uniform manner. This provides a realistic simulation of a change in the skin color of the patient simulator. By contrast, the direct placement of light sources such as LEDs below the skin would result in a clear, yet altogether more unrealistic image. The point cyanosis on the site where the light source is placed, e.g. on the cheeks or in the mouth, would not be physiologically correct and have an unnatural effect.

A preferred embodiment provides that the at least one light source is comprised of an RGB LED whose color channels are individually actuatable independently of one another. The use of multicolor RBG LEDs allows for the realization of different color nuances in a simple manner. Such LEDs preferably have at least three individual LED elements of different colors. For covering the whole spectrum of visible light (and hence, above all, the different nuances of cyanosis and hyperoxia), the three LED colors red, green and blue of the LED source are preferably additively mixed. Owing to the developments in microelectronics, different options are presently available for actuating RGB LEDs, ranging from the application of a combination of individual LED components with discrete actuation to highly integrated components with digital control lines for adjusting the color temperature. Another advantage of RGB LEDs is the space-saving set-up option of several light elements, in particular if these can be cascaded in series via a serial bus. With series cabling, just one control line is necessary for programming the modules, the serial data signal each being composed of, for instance, eight bits per color of each light module and the information being transmitted through all modules. Hence results that, as a function of the number of modules, an identical number of 3-color bytes has to be generated to provide all modules in the chain with color information.

The whole color range of the RGB LEDs preferably comprises >4 million, in particular 16 million, possible colors and hence comprises the entire visible color spectrum from white to black. By selecting a suitable color, a realistic coloration of the simulated skin is thus possible in a simple manner. For the color control management and data exchange, a separate microcontroller is preferably provided, which receives control commands from a master control system and passes them on to the individual RGB LEDs.

For realizing skin coloration in the forehead region of the simulated head, it will be preferred if a light source is disposed on the inner surface of the skull cap of the simulated skull. The thus achieved indirect illumination in the interior of the simulated skull provides a homogenous, uniform light distribution. To this end, the LED module provided therefor can preferably be medially glued to the skull base, thus indirectly illuminating the inner part of the skull cap. The reflection occurring via the simulated skull, which is preferably designed in white, will thus homogenously illuminate the entire forehead region and the lateral portions of the skull. In combination with an illumination of the cheeks, this will result in a uniform illumination of the entire upper head region. Hence results an extremely realistic representation of cyanosis and hyperoxia in the head region.

For realizing a skin discoloration in the nasal mouth region of the simulated head, it is preferred that a light source is disposed in the simulated skull so as to illuminate the middle cranial fossa from inside. The direct illumination of the skull bones of the simulated skull from the interior of the simulated skull, in the region of the middle cranial fossa, produces a homogenous and realistic light distribution radiating from the boundary layers between the simulated skull and the simulated skin. This brings about extremely realistic colorations in the region of the nasal mouth region. Also in view of series production, the irradiation of the bones from the interior of the skull offers a clear advantage. The light modules are thus protected from any mechanical stress and are easy to construct and exchange. In addition to the good light distribution and advantages for series production as well as durability, this will, moreover, result in a reduction of the power consumption for the light source, since this method will not involve any power losses due to the connection of an optical waveguide via an adapter.

A homogenous illumination of the simulated skin is preferably also achieved in that the simulated skull is made of a polymer, translucent, in particular white, material and the simulated skin is formed transparent or translucent, in particular of a silicone material.

For the illumination of regions difficult to accede, e.g. the mouth and chin zones, due to limited space conditions, the use of optical fibers is advantageous. The space conditions will, in particular, be restricted if the simulated head comprises simulated upper airways. A preferred configuration in this connection provides that a light source is connected to an optical fiber extending in an arc-shaped manner in the chin region of the simulated head and arranged to emit light along the arc, wherein the light-emitting arc-shaped region of the optical fiber is preferably provided between the simulated skin and a simulated airway, or the mandible. The irradiation in the arc-shaped region is advantageously achieved by a roughening and/or indentation of the outer surface of the optical fiber. This will additionally provide a diffuse and planar irradiation. The optical waveguide is preferably arranged such that the light-emitting arc-shaped region is guided in parallel with a simulated mandible.

According to a fifth, independent aspect of the invention, which can optionally be realized in a patient simulator according to any of the preceding aspects of the invention, a patient simulator, in particular a premature baby, newborn or child simulator, is provided, comprising a simulated head including a simulated nose with two flexible nasal alae, wherein a drive element such as at least one thread or lever, which leads into the interior of the simulated head, contacts the nasal alae to simulate widening and narrowing of the nasal alae. What is called "flaring of the nasal alae" is the breath-synchronous widening of the nasal alae during inspiration and constitutes a symptom of a breath insufficiency syndrome.

The activation of the movement of the nasal alae is preferably effected in that a lever mechanism cooperates with a drive element, e.g. an electromagnet, for moving the lever. The lever mechanism is constructed such that, when activating the electromagnet, the opposite lever ends are oppositely moved, thus causing an abduction of the ends in the nasal alae when the levers are attracted towards the magnet. The activation of the magnet thus causes an expansion of the nostrils. The deactivation of the electromagnet will restore the nasal alae due to the elastic design of the nasal alae using an appropriate plastic material.

A breath-synchronous movement of the nasal alae is preferably achieved in that a central control device is provided, which is arranged to actuate the lifting and lowering mechanism of the simulated thorax and to actuate the drive element for the nasal alae such that the widening of the nasal alae and the lifting of the at least one liftable and lowerable chest element occur synchronously.

A sixth, independent aspect of the invention is concerned with another problem arising in patient simulators. To assess the lungs and the heart and the abdomen, it is advantageous for training purposes to be able to auscultate sounds by the aid of a stethoscope. With conventional patient simulators, this is accomplished by installing loudspeakers in the region of the respective organs. However, this involves clear disadvantages. In most cases, just one loudspeaker for the heart, two loudspeakers for the lungs, and optionally one loudspeaker for intestinal sounds via the abdomen, are provided. This forces the user to precisely reach the loudspeaker, which is invisible from outside, in order to be able to clearly auscultate the sounds. But even if the user reaches the position of the desired loudspeaker, parasitic noises from the simulation facilities will also be heard in most cases, which are irritating and, in the end, do not allow for correct auscultation.

In order to overcome these drawbacks, a sixth, independent aspect of the invention, which can optionally be realized in a patient simulator according to any of the preceding aspects of the invention, provides a patient simulator, in particular a premature baby, newborn or child simulator, comprising a simulated thorax, a simulated abdomen, a stethoscope simulator and an audio generator, wherein the simulated thorax and the simulated abdomen comprise at least two distance sensors cooperating with a stethoscope head of the stethoscope simulator for detecting the position of the stethoscope head, wherein the detected position data are feedable to the audio generator, wherein the audio generator comprises a memory for audio files and a processing device for mixing the audio files as a function of the position data to a mixed audio signal to be supplied to an earphone of the stethoscope simulator.

A distance sensor in this case is meant to denote a sensor emitting a signal proportional to the distance, in particular the spherical distance, between the sensor and the stethoscope head. The position of the stethoscope head can be determined based on the distance data, preferably by mathematical triangulation, in order to obtain position data. The calculation of the position data from the distance data can be performed either in the patient simulator or externally. The audio generator is preferably disposed outside the patient simulator. The invention is thus based on the idea of not generating in the patient simulator the sounds to be auscultated, but just detecting the position of the stethoscope in the patient simulator and generating the sounds according to said position in the stethoscope itself or in an external unit.

In this respect, it is preferably provided that the simulator comprises a near-field transmitter and the stethoscope comprises a resonant receiver circuit. The near-field transmitter of the simulator generates an electromagnetic near field at a pregiven frequency. Thus, a defined carrier frequency of, for instance, 100 kHz is, for instance, used.

In the simulator itself, there are transmitter coils tuned to the carrier frequency. The resonance frequency and the amplitude in the associated resonating circuit will change as a function of the distance to the receiver. The thus acquired distance data represented by the amplitude and the frequency are evaluated for position determination, and the result is supplied to the audio generator in that a processing device ensures that stored audio files are mixed, as a function of the position, to a combined audio signal to be supplied to an earphone of the stethoscope simulator. Preferably, the distance or position data can be supplied to the audio generator as analog signals so as to enable the weighting of the loudness of the audio files, such as sounds of the right and left lungs, the heart, the abdomen, as well as artificial parasitic noises, as a function of a correct, smooth application of the stethoscope and the mixing of the audio files to a resulting audio signal. The trainee will thus be confronted with the situation that, when positioning the stethoscope simulator on the left chest, a clear lung sound will be mixed and, when placing it near the heart, clear cardiac sounds will be mixed.

Alternatively, it may be contemplated that the near-field transmitter is arranged in the stethoscope and the receiver circuit is arranged in the simulator. Correspondingly, the implementation of the transmitter and the receiver is exchangeable as a function of their application.

The audio generator can be arranged either in a simulated stethoscope of the stethoscope simulator or in an external unit separate from the simulated patient of the patient simulator and from the stethoscope simulator. The audio signal mixed by the audio generator disposed in an external unit can be wirelessly transmitted to a receiver unit of the stethoscope simulator, preferably by wireless data transmission such as Bluetooth, and therefore be heard via an integrated earphone without any interfering parasitic noises.

A preferred configuration provides that for each position on the simulated thorax and on the simulated abdomen at least one audio signal representing sounds of the human body on the respective position is mixable. In doing so, the sounds, weighted as a function of the position of the stethoscope head, are mixed from at least one stored audio file and emitted in the stethoscope.

The individual audio files each represent a simulated sound source such as a cardiac sound, a lung sound, an abdominal sound and the like, and are therefore each assigned to the position of the respective sound source. Moreover, the processing device for mixing the audio files is advantageously configured such that an audio file is added to the mixed signal at a loudness that is the higher the smaller the distance of the stethoscope head from the position assigned to said audio file or said simulated sound source.

When generating the mixed audio signal, further parameters may be taken into consideration in addition to the position information. It will, for instance, be advantageous if the heart sound is adapted in such a manner as to indicate the heart rate. The same applies to the lung sounds for the respiratory rate. Furthermore, the sounds may, of course, vary as a function of pathological states. A preferred configuration of the invention in this connection contemplates that each audio file with a physiological sound can be replaced by an audio file with a pathological sound, and the latter is mixed for outputting the position-bound audio signal according to the position of the stethoscope head.

In order to be able to reproduce all kinds of sound sources of the human body as realistically as possible, it is preferably provided that at least one audio file simulates a heart sound and is therefore assigned to the position of the heart of the simulated thorax, that one audio file simulates a first lung sound and is therefore assigned to the position of the left lung of the simulated thorax, that one audio file simulates a second lung sound and is therefore assigned to the position of the right lung of the simulated thorax, and/or that one audio file simulates an abdominal sound and is therefore assigned to the position of the stomach of the simulated abdomen.

In any of the above described aspects of the invention, it is generally provided in a preferred manner that the patient simulator comprises a complete body of the respective patient, i.e., in particular, a premature baby, a newborn or a child, and therefore also comprises simulations of the extremities in addition to a simulated thorax, a simulated abdomen and a simulated head. Moreover, the patient simulator, in terms of its dimensions and with respect to the proportions of its simulated body parts, is configured such that it corresponds to the dimensions and proportions of a real patient, i.e. a human premature baby, newborn or child.

BRIEF DESCRIPTION OF THE DRAWINGS

In the following, the invention will be explained in more detail by way of exemplary embodiments schematically illustrated in the following drawings:

FIGS. 6 and 7 are illustrations of the simulated skin in two different states of the intercostal retraction;

DETAILED DESCRIPTION

Figure 1:
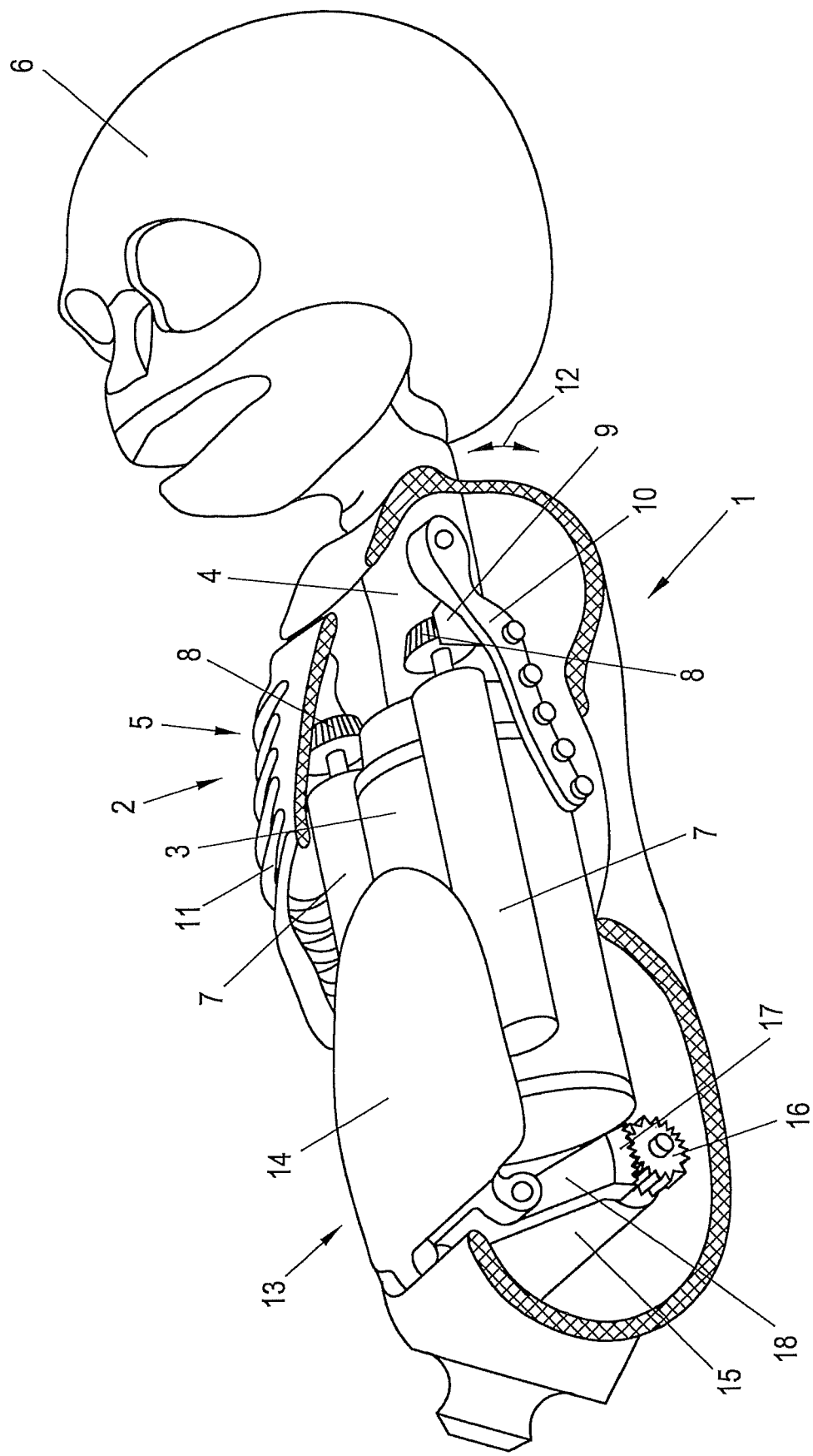
FIG. 1 depicts a premature baby simulator in a partially opened illustration.

FIG. 1 depicts a premature baby simulator 1 comprising a simulated thorax 2, a lung simulator 3, and a simulated trachea 4 leading to the lung simulator 3. The simulated thorax 2 comprises a right liftable and lowerable chest element 5 for the right hemithorax and a left liftable and lowerable chest element 5 for the left hemithorax (not illustrated in FIG. 1). The simulator 1 further comprises a simulated skull 6. The two chest elements 5 are designed to be liftable and lowerable separately from each other and are each equipped with their own actuatable lifting and lowering mechanism. The lifting and lowering mechanism disposed in the interior of the simulator 1 on both sides each comprises an electromotor drive unit 7 driving a gear 8. The gear 8 engages in a toothing formed on a pivotally mounted arm 10, wherein the respectively right or left thorax element 5 is fastened to the arm 10 such that the rotary movement of the gear 8 is translated into a lifting or lowering movement of the arm 10 with the chest element 5 in the sense of double arrow 12 as a function of the direction of rotation. The left and right chest elements 5 each comprise a simulated rib 11.

The simulator 1 further comprises a simulated abdomen 13 including a liftable and lowerable abdominal plate 14, wherein lifting and lowering of the abdominal plate 14 is performed—analogously to the lifting and lowering movement of the chest element 5—by an electromotor drive unit 15 driving a gear 16, which in turn engages a toothing 17 formed on a pivotally mounted arm 18, to which the abdominal plate 14 is fastened.

Figure 2:
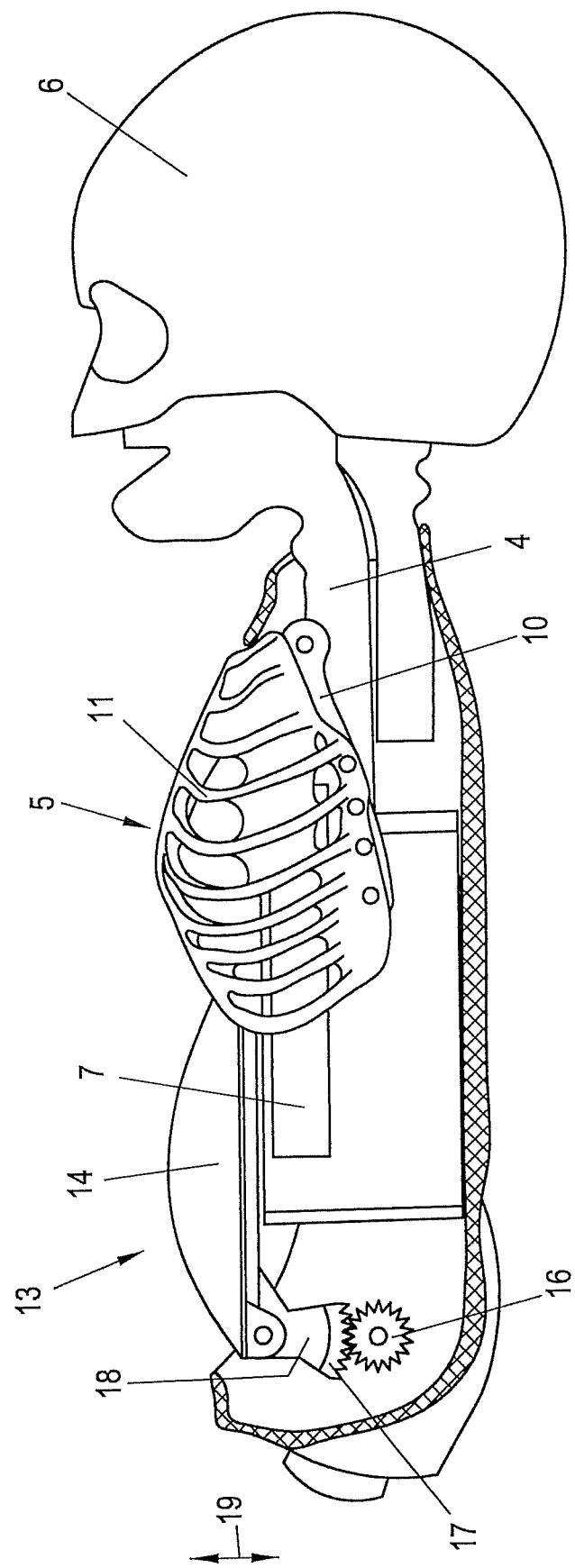
FIGS. 2 and 3 depict the premature baby simulator with an abdominal plate in different positions.
Figure 3:
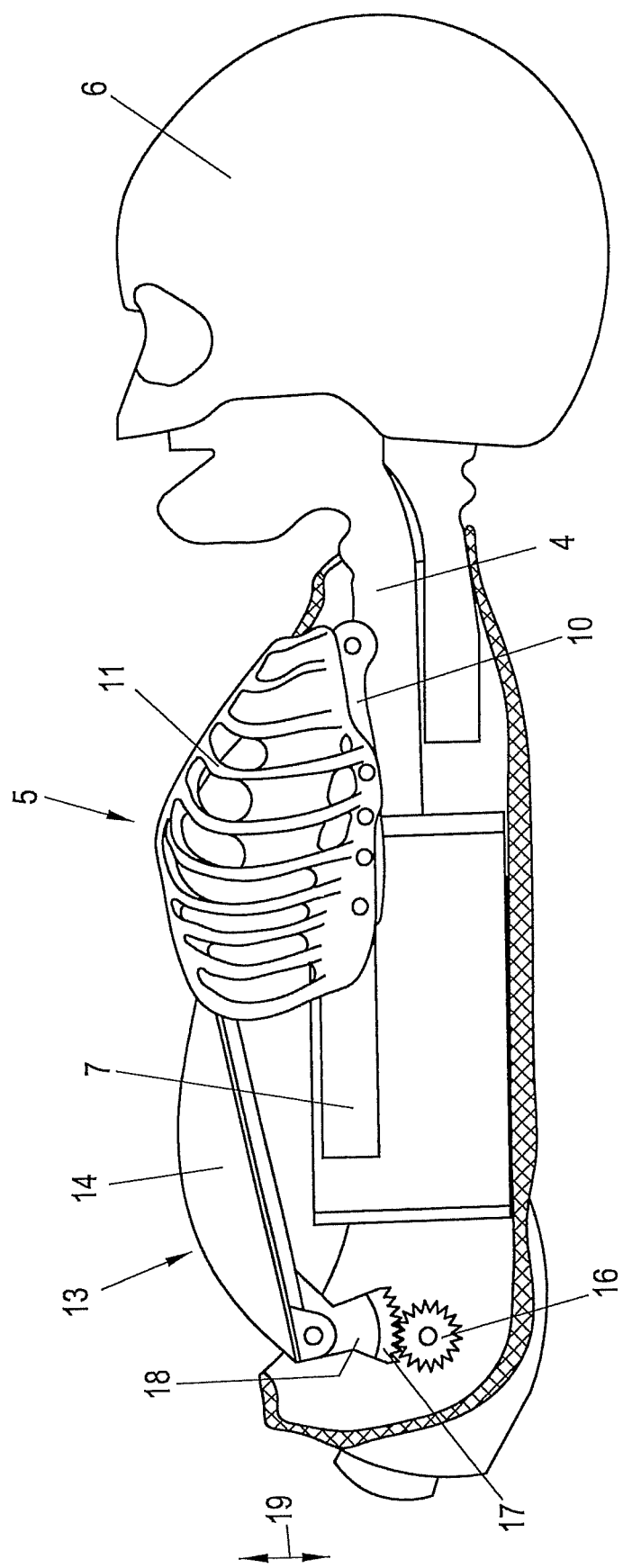

FIG. 2 depicts the abdominal plate 14 and the chest elements 5 in the lowered position, and FIG. 3 depicts the abdominal plate 14 and the chest elements 5 in the raised position.

When activating the electromotor drive unit 15 (not illustrated in FIGS. 2 and 3), the gear 16 is rotated, and the lifting/lowering of the abdominal plate 14 in the sense of arrow 19 is caused by the gear 16 engaging in the toothing 17 and thus inducing pivoting of the drivable arm 18. A simulation of the lifting or lowering of the abdomen is possible as a function of the direction of rotation of the gear 16.

Figure 4:
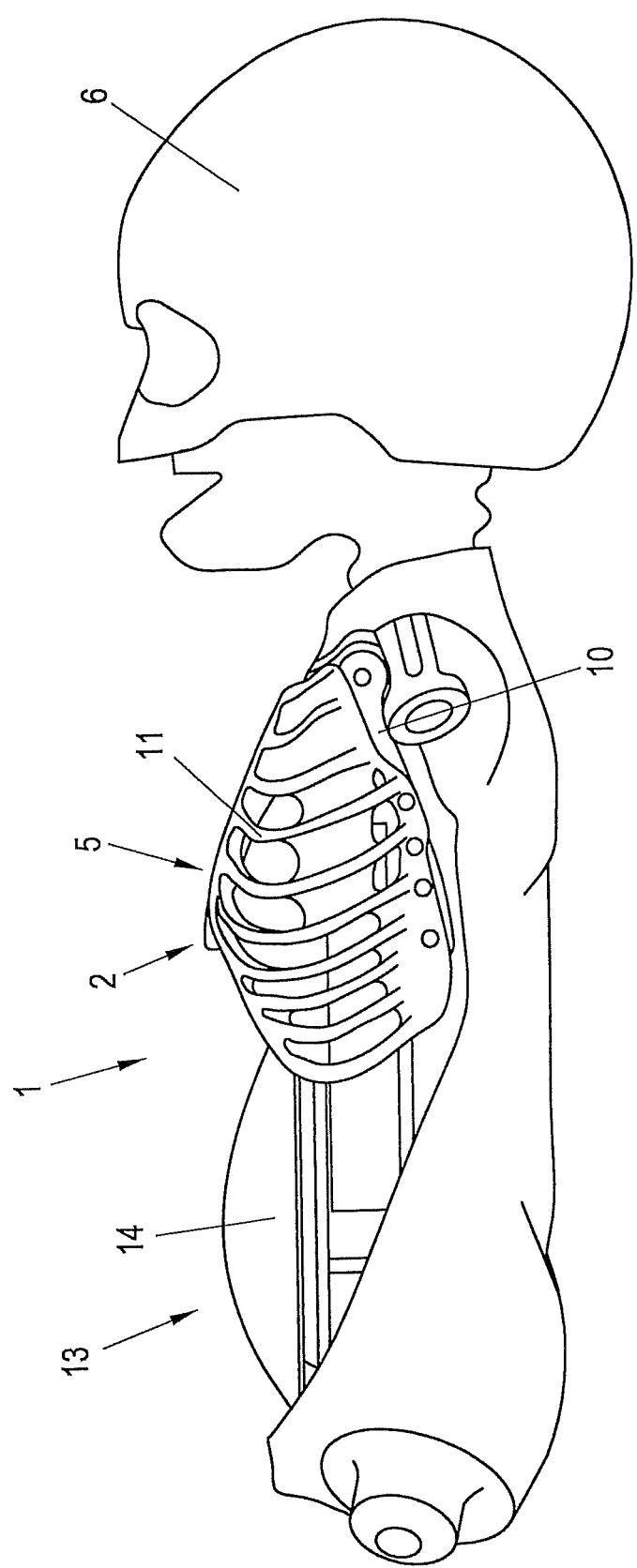
FIG. 4 is a further illustration of the premature baby simulator.

FIG. 4 illustrates the complete anatomical support structure of the simulator 1, which is overlaid by a simulated skin 20 (not illustrated in FIG. 4) covering the entire simulator 1, i.e. also the simulated thorax 2 with the simulated ribs 11, as well as the simulated abdomen 13 with the abdominal plate 14. The simulated skin 20, in particular, encompasses the simulated thorax 2 and the simulated abdomen 13. The simulated skin 20 is made of an elastic material such as a silicone material in order to allow for the lifting and lowering of the chest elements 5 and of the abdominal plate 14.

Figure 5:
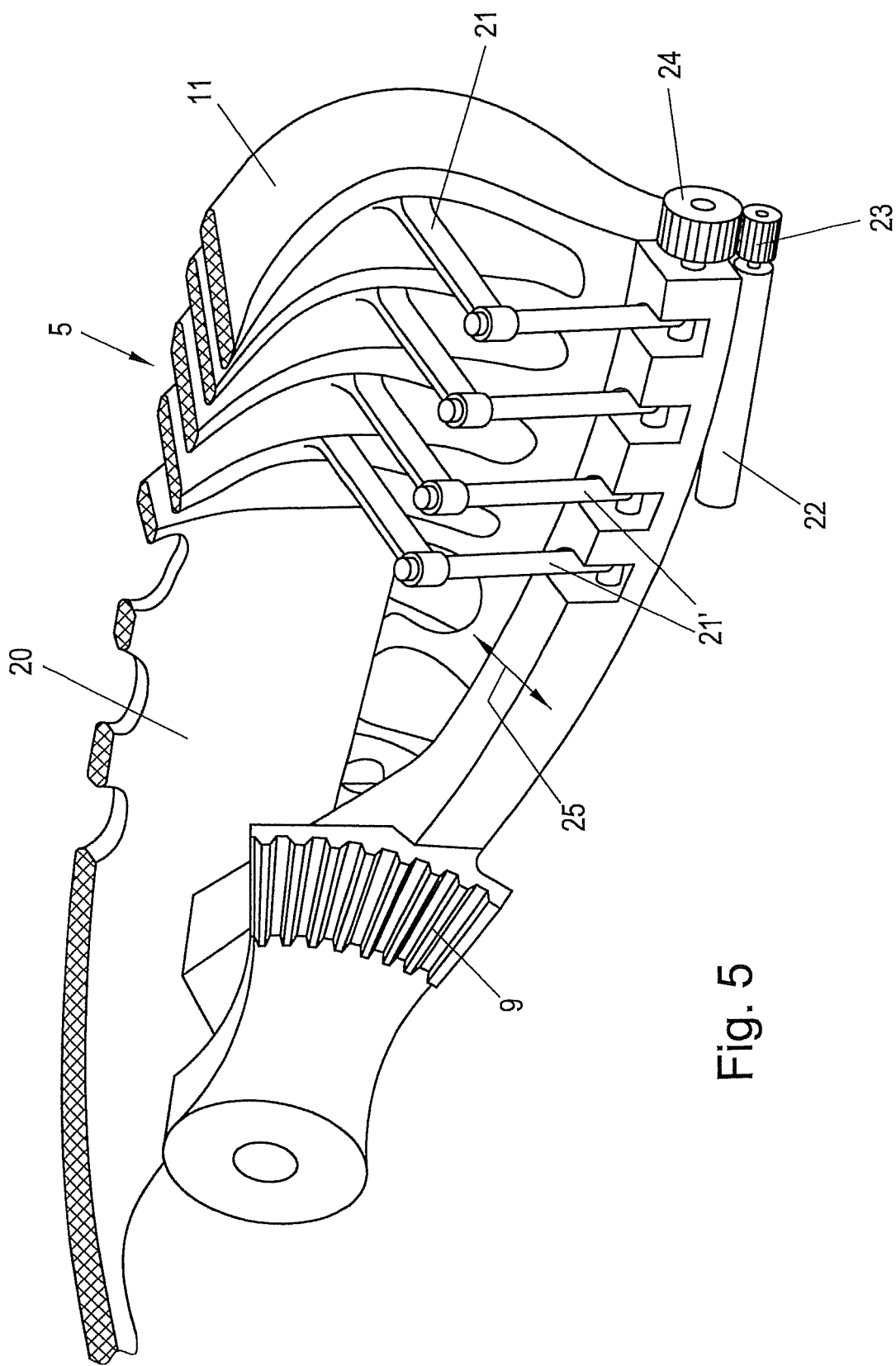
FIG. 5 is a detailed view of the premature baby simulator including a mechanism for intercostal retraction.

From FIGS. 5 to 7, it is further apparent that tension means 21 contacting the simulated skin 20 are provided for simulating an intercostal retraction. The tension means 21 extend between the individual ribs of the simulated ribs 11 and are each fixed to pivot rods 21' on their ends facing away from the simulated skin 20. The pivot rods 21' are rigidly fastened to a joint axle and thus pivotable about said axle, wherein an electromotor drive unit 22 (also referred to as a drive unit) is provided as a pivot drive, driving to rotational movement the gear 23, which engages the gear 24 fastened to the axle of the pivot rods 21'. Pivoting of the pivot rods 21' in the sense of double arrow 25 causes the simulated skin 20 to be pulled between the simulated ribs 11 and returned into its normal position. Depending on the direction or rotation of the drive 22, a simulation of an intercostal retraction, or the normal position, of the simulated skin 20 is thus possible. The drive 22 is fastened to the arm 10, which is responsible for the lifting and lowering of the simulated ribs 11. In that the drive 22 can be moved along with the arm when the latter is lifted or lowered, the simulation of the intercostal retraction of the simulated skin 20 can be effected independently of the respective position of the simulated ribs 11.

The simulated skin 20 is illustrated in the normal position in FIG. 6, and in the simulated intercostal retraction position in FIG. 7.

Figure 8:
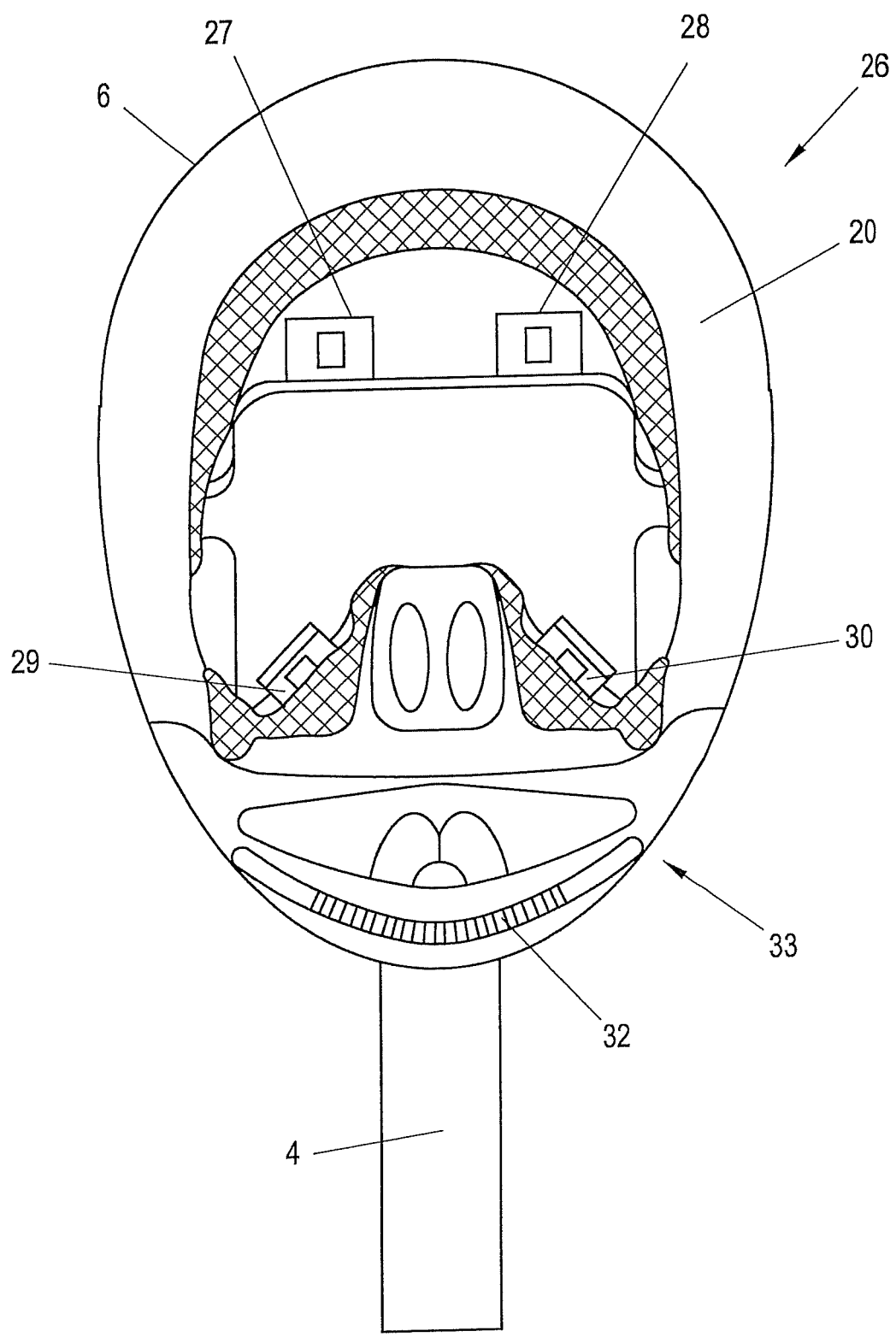
FIG. 8 is a sectional view of the simulated skull of the premature baby simulator.
Figure 9:
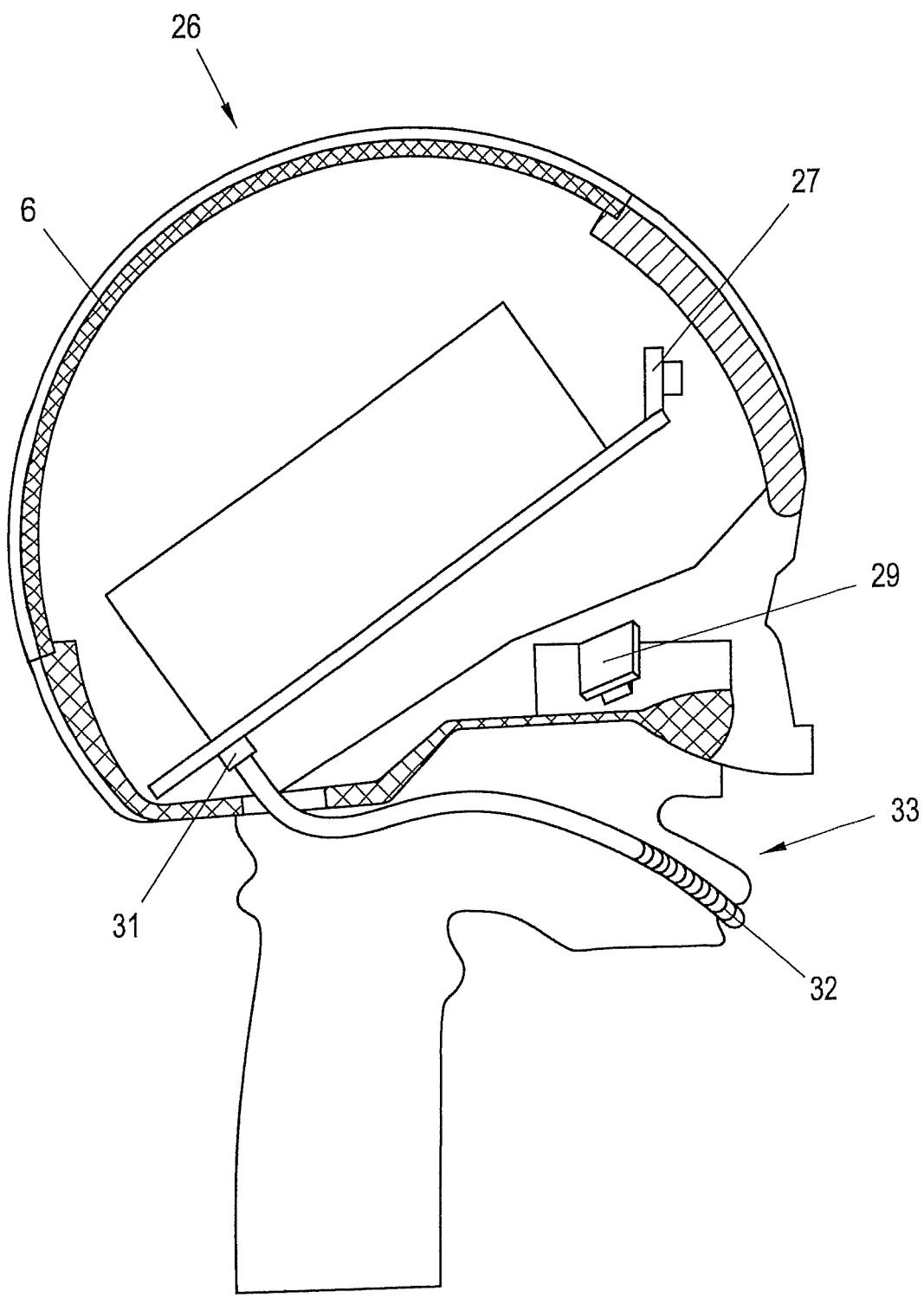
FIG. 9 depicts a further sectional view of the simulated skull of the premature baby simulator.

FIGS. 8 and 9 each depict a simulated head 26 of the simulator 1, which comprises a simulated skull 6. Light sources 27, 28, 29, 30 and 31 are disposed within the simulated skull 6.

The light sources 27 and 28 are fastened to a carrier plate disposed in the cranial cavity and oriented toward the inner surface of the skull cap of the simulated skull 6 in the region of the forehead. The light sources 29 and 30 are located in the middle cranial fossa of the simulated skull 6. A further light source 31 is disposed in the interior of the simulated skull 6, energizing an optical fiber 32 extending in an arc-shaped manner in the chin region 33 of the simulated head 26.

Figure 10:
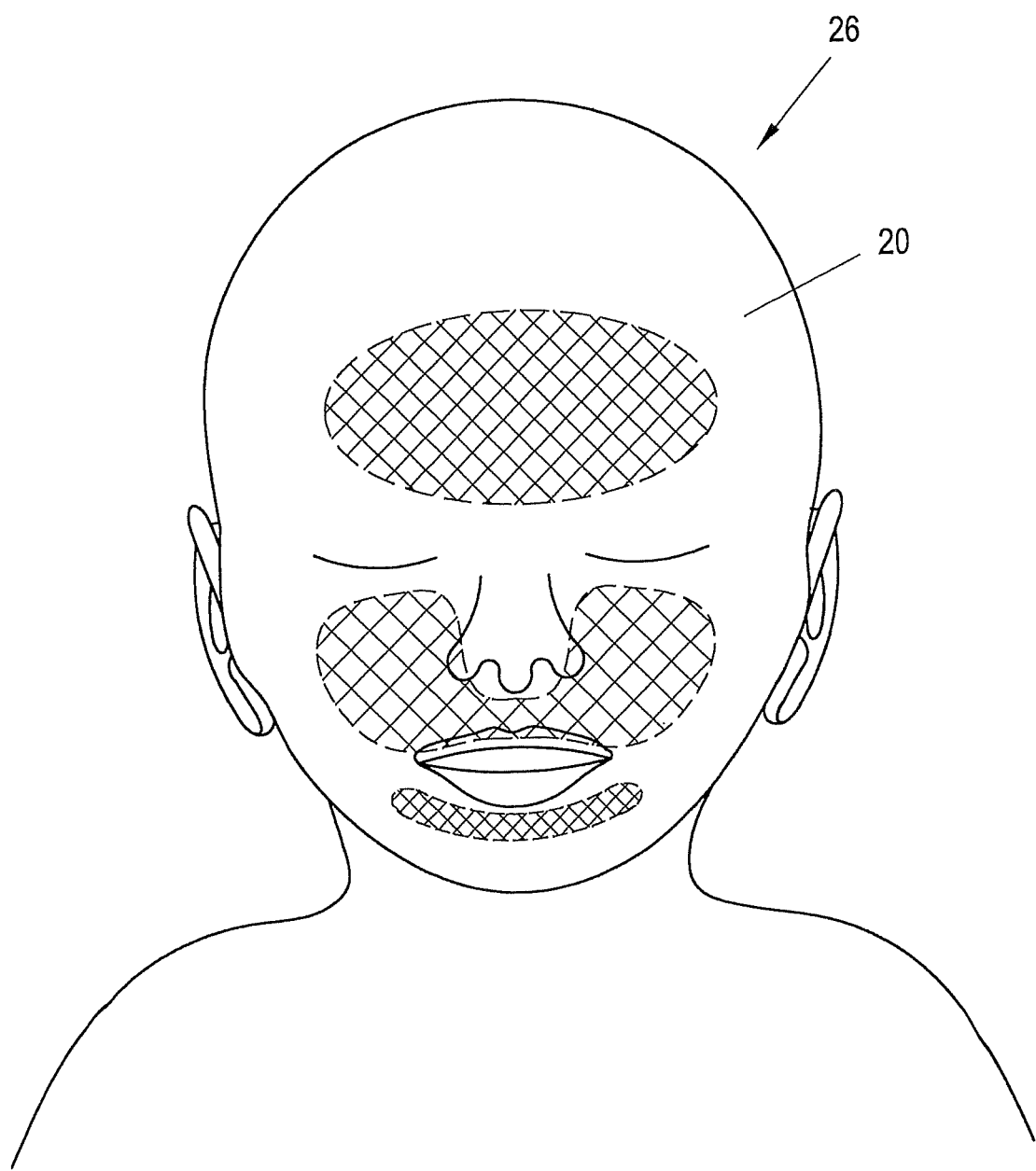
FIG. 10 is a front view of the simulated skull of the premature baby simulator.

In that the simulated skull 6 and the simulated skin 20 are designed to be translucent, an illumination pattern as illustrated in FIG. 10 of the facial regions will result upon activation of the light sources 27 to 31, which facial regions will turn blue in the event of cyanosis and red in the event of hyperoxia.

Figure 11:
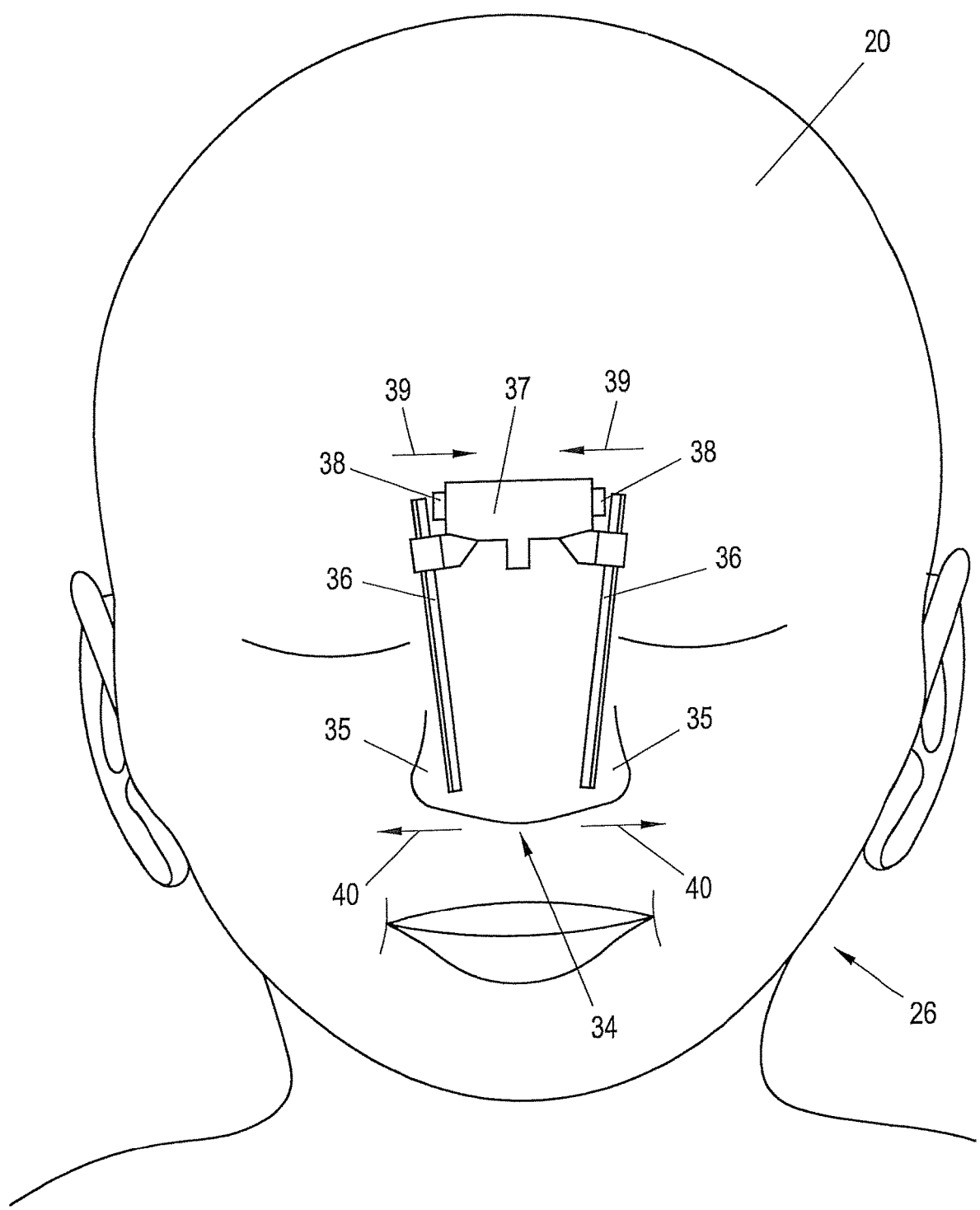
FIG. 11 is a detailed illustration of the simulated skull in the region of the nose.

FIG. 11 depicts the simulated head 26 of the simulator 1 with a simulated nose 34 including two flexible nasal alae 35 contacted by levers 36 leading into the interior of the simulated head 26 along the nasal alae 35, said levers being made of a magnetizable material. Furthermore, a control device 37 carrying electromagnets 38 is provided, said electromagnets 38 being activated upon actuation of the control device 37 and the magnetic levers 36 being attracted in the sense of arrows 39, thus causing flaring of the nasal alae in the sense of arrows 40.

Figure 12:
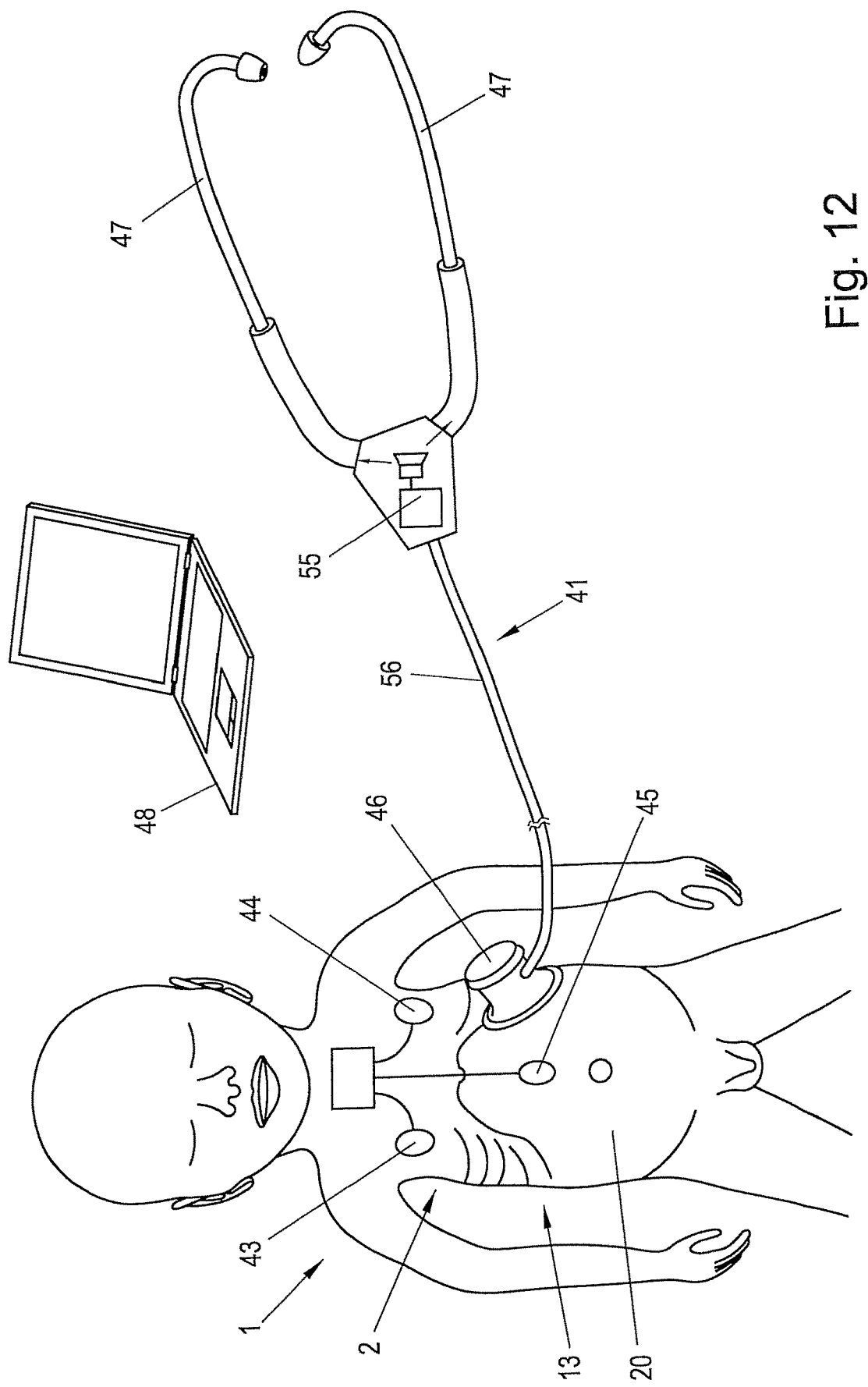
FIG. 12 is a stethoscope simulator cooperating with the premature baby simulator.

FIG. 12 depicts a simulated skin 20 covering the entire simulator 1, i.e. also the simulated thorax 2 with the simulated ribs 11 and the simulated abdomen 13 with the abdominal plate 14. The simulated skin 20, in particular, encompasses the simulated thorax 2 and the simulated abdomen 13. The simulated skin 20 is made of an elastic material such as a silicone material in order to allow for the lifting and lowering of the chest elements 5 and of the abdominal plate 14.

FIG. 12, moreover, depicts a stethoscope simulator 41, wherein the simulated thorax 2 and the simulated abdomen 13 comprise three distance sensors 43, 44, 45 cooperating with a stethoscope head 46 of the stethoscope simulator 41 for determining the distance between the stethoscope head 46 and the respective distance sensor 43, 44, 45 in order to receive distance-proportional signals. The control unit 48 comprises a memory for audio files and a processing device for mixing the audio files as a function of the distance data to a mixed audio signal, which is supplied to the earphones 47 of the stethoscope simulator 41.

Figure 13:
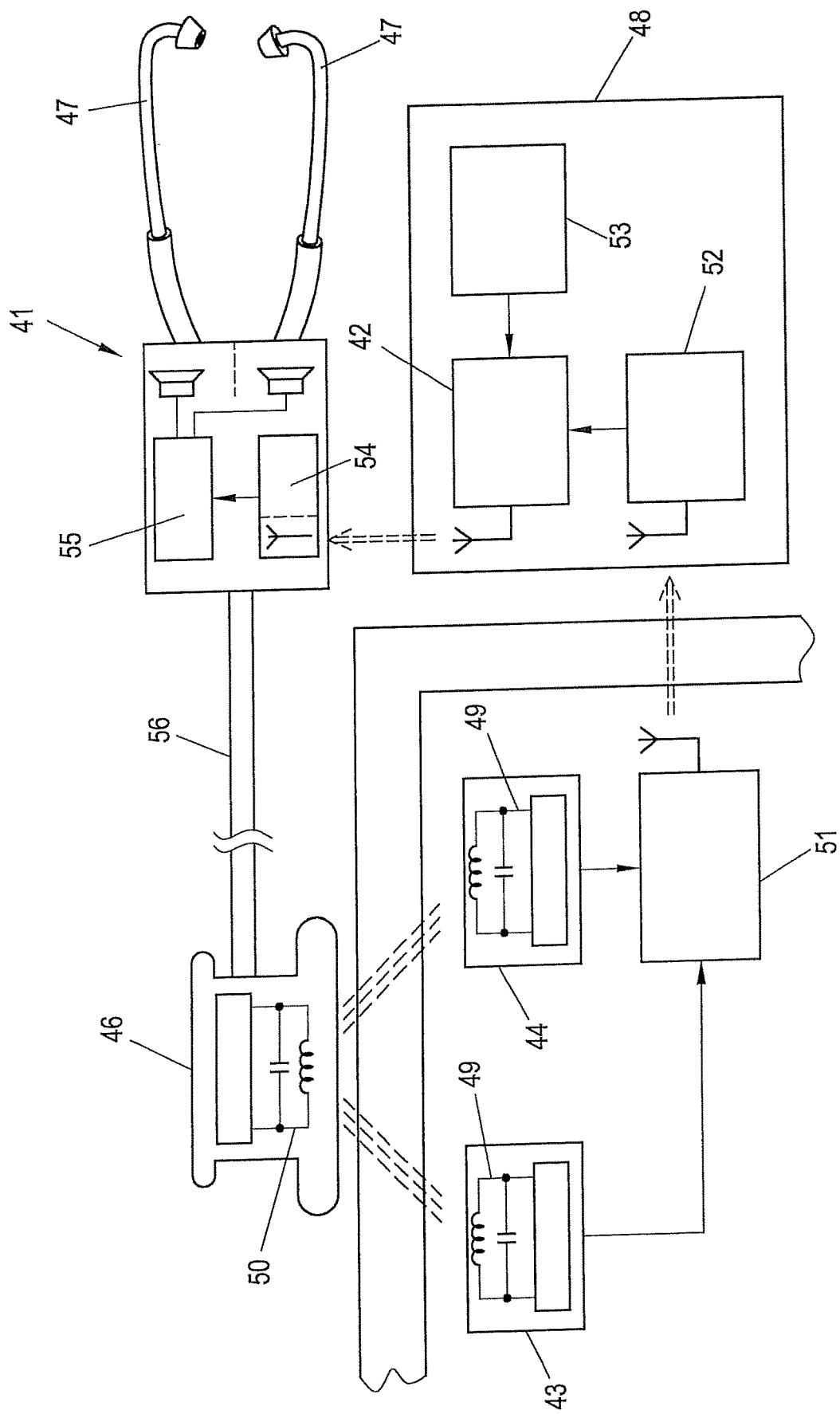
FIG. 13 is a circuit diagram of the stethoscope simulator.

FIG. 13 is a schematic circuit diagram, from which it is apparent that the distance sensors 43, 44, 45 (not illustrated in FIG. 13) of the patient simulator 1 are configured as near-field transmitters each including a resonant transmitter circuit 49, and the stethoscope head 46 comprises a resonant receiver circuit 50. The near-field transmitters of the patient simulator 1 generate electromagnetic near fields at a pre-given frequency, the carrier frequency being, for instance, defined at 100 kHz. The resonant transmitter circuits 49 are tuned to said carrier frequency, the resonance frequency and the amplitude changing as a function of the distance from the resonant receiver circuit 50. The resonance frequency and the amplitude of the two resonant transmitter circuits 49 are evaluated in an evaluation device 51 and wirelessly transmitted to a central, external control device 48 such as a control computer as distance data representing the respective distance to the stethoscope head 46. The distance data are received by the receiver module 52 in the control device 48. The distance data can be immediately fed to the audio generator 42, or initially converted into position data, e.g. by triangulation methods. In the audio generator, a processing device ensures that stored audio files 53 are mixed to a collective audio signal as a function of the distance or position data. The audio signal is wirelessly transmitted to a receiver module 54 of the stethoscope simulator 41 and amplified there in an amplifier 55, and supplied to the earphones 47. The stethoscope simulator 41 further comprises a power supply (not illustrated), which energizes not only the receiver module 54 and the amplifier 55, but also the resonant receiver circuit 50 via lines 56.

Figure 14:
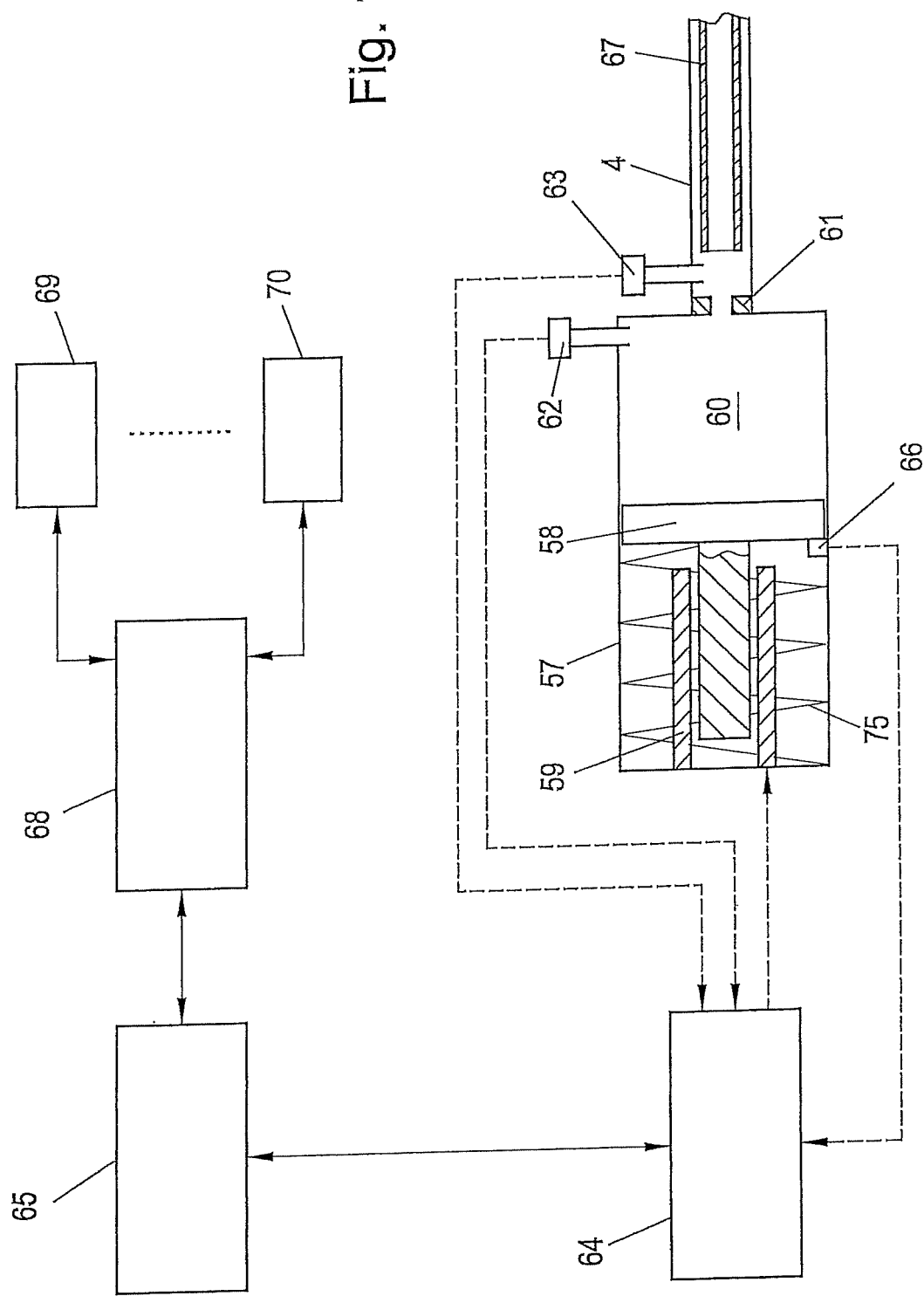
FIG. 14 gives an overview of the control logistics of the patient simulator, in particular in respect to the lung model.

In FIG. 14, the control means of the lung simulator and the separate actuating means of the lifting and lowering mechanism of the simulated thorax are illustrated in detail.

The lung simulator 3 comprises a rigid-wall and preferably metallic cylinder 57, in which a piston 58 is arranged so as to be movable in the axial direction by means of a drive 59 (e.g. a stepper motor). To drive the piston 58, the stepper motor may be replaced by a linear motor preferably functioning based on an electromagnetic field, e.g. by a magnetic linear drive. The piston 58 defines a working volume or cavity 60 of the lung simulator 3, into which a simulated trachea 4 opens, into which the tube 67 of a breathing device (not illustrated) can be introduced. On the transition from the simulated trachea 4 into the cavity 60 is provided a constriction 61, through which the flow cross section of the air in the simulated trachea 4 is narrowed. Moreover, pressure sensors 62 and 63 with pressure-relief valves (not illustrated) are provided for limiting the maximally permissible pressure, which are arranged to measure the pressure in the cavity 60 and in the simulated trachea 4.

In order to simulate the individual lung functions, a computer-aided control device 64, in particular a computing device, is provided, which cooperates with a physiological computation model 65 enabling the simulation of physiological contexts of the simulated parameters of the lung simulator. The control device 64 is fed with the signals of the pressure sensors 62 and 63 as well as the signals of a sensor 66 for acquiring the current position of the piston 58. The control device 64 generates control commands for the piston drive 59 to actuate and move the piston 58 in a controlled manner, wherein the use of a rapid controller and the rigid configuration of the cavity-defining walls allow for the simulation of the behavior of a flexible membrane provided in conventional lung simulators.

In order to simulate a patient to a connected breathing machine, it will do to simulate the tidal volume of the respirated patient, which constitutes just a small portion of the overall capacity of the lung. The cavity 60 of the lung simulator, therefore, is dimensioned such that, at the maximum piston position, it corresponds to the tidal volume plus a volume reserve for control, of a human patient, in particular a premature baby, newborn or child.

In order to simulate a lung to a breathing device, the volume and pressure courses over time must lie within a range of physiological and pathological parameters. It will thereby be ensured that the use of (mechanical and manual) respiratory devices in combination with the integrated lung simulator will result in the display of realistic respiratory parameters and allow for the adjustment of realistic respiratory pressures and volumes in respiratory machines. This will thus also ensure the realistic triggering of pressure and volume alarms in the respiratory machine.

To simulate the tidal air volume of the patient simulator, the volume of the cavity 60 is increased during the simulation of inspiration, and reduced during the simulation of expiration, by appropriately moving the piston 58.

For the simulation of the compliance, both the current pressure in the cavity 60 and the current volume of the cavity 60 are determined. The compliance in this respect is defined as the volume increase $\Delta V$ per increase in the applied gas pressure $\Delta p$, wherein the dependency of the volume increase $\Delta V$ on the pressure increase $\Delta p$ is not linear, i.e. the ratio $\Delta V/\Delta p$ decreases towards the end of inspiration (even a small volume increase will cause a large pressure increase). The pressure p is measured by a pressure sensor 62. The volume V results from the known cross section of the cylinder 57 and the piston position measured by the sensor 66. In case the pressure changes in a way other than pregiven by the piston position (directly proportional to the volume), the piston can be repositioned by means of the electromechanical drive 59. To this end, the control resolution in terms of time must be selected as high as possible such that no quantization levels will be discernible. In the chosen structure, a volume flow sensor can be additionally realized by a second pressure sensor in the working volume in connection with a constriction on the piston outlet, which may be utilized to refine the image.

As regards the respiratory device, only the pressure at the end of the tube is of relevance. This fact can be utilized to simulate the resistance by the dynamic component of the control circuit. A time component is thus additionally introduced into the system. With an elevated flow resistance in the airways, the filling of the lung will be delayed or complicated such that no gas exchange will be enabled in the provided time.

$$R = \frac{\Delta p}{\dot{V}} \dot{V} = \frac{\Delta V}{t}$$

At an elevated resistance, a backdraft of the respiratory gases in the tube will occur, with the pressure increasing and the volume flow decreasing. A low resistance R in the lung produces a low counter-pressure p in the tube, the volume flow $\dot{V}$ becomes maximal.

In order to simulate this effect by using a single piston 58, it is necessary to adapt the pressure in the cavity 60 to the pressure in the tube 67. At a low resistance, the pressure in the cavity 60 is maintained lower than or equal to the pressure in the tube 67 in order to facilitate the inflow of the gases. At an elevated resistance, an elevated counter-pressure is generated in the cavity 60, which will impede the inflow of the respiratory gases. A reduction or increase of the counter-pressure is achieved by displacing the piston 58. Overall, two actuating variables are thus taken into consideration when selecting the position of the piston: On the one hand, the piston position resulting from the compliance as a function of the pressure in the cavity 60, on the other hand the adjustment of a counter-pressure resulting from the resistance.

From the acquisition of the pressures in the cavity 60 and in the tube 67, and based on the known diameter of the constriction, the current volume flow can be additionally concluded.

The optional spring 75 acting on the piston provides a so-called basic compliance, i.e. the spring 75 causes the passive maintenance of the pressure in the cavity 60 of the lung simulator.

Another aspect refers to the evaluation of the volume flow, since the two pressure sensors with the constriction form a volume flow sensor directly measuring the volume flow.

Owing to the measured values of the pressure sensors 62 and 63, and based on the piston position determined by the sensor 66, the volume of the cavity 60, the volume flows into and out of the cavity 60 as well as the pressure in the cavity 60 are available in the control device 64. Information relating to the compliance and the resistance can be calculated therefrom by the physiological computation model 65 and, vice versa, the respective values for pressure, volume flow and volume can be calculated from a predetermined compliance value and a predetermined resistance value.

The physiological computation model is configured to define the current filling volume from the values for the compliance, resistance and respiratory pathologies (e.g. inverted breathing) and, moreover, to separately generate the position data for the current position of the simulated chest and the abdominal plate, which are fed to the animation controller 68. In the animation controller 68, control signals for the lifting and lowering mechanism 69 cooperating with the simulated chest, and for the lifting and lowering mechanism 70 cooperating with the abdominal plate, are generated therefrom such that the simulation of the breathing movements is effected synchronously with, and corresponding to, the simulation state of the lung simulator 3.

Figure 15:
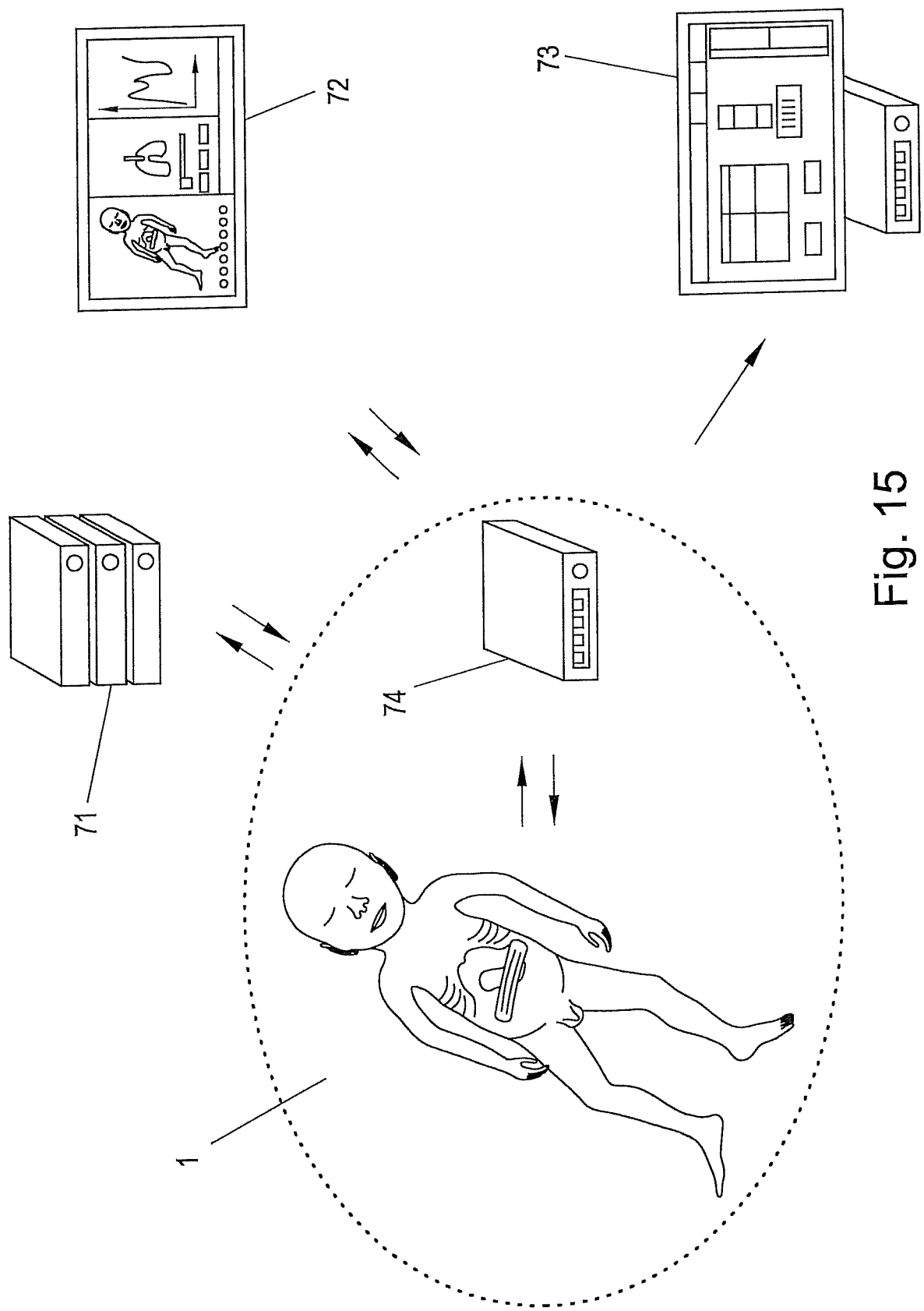
FIG. 15 gives an overview of the patient simulator including control and monitoring components.

FIG. 15 is an overall view of a simulation system comprising the patient simulator 1 and the control and monitoring components. The patient simulator 1 constitutes a simulation of the entire body of a premature baby, newborn or child. The system further comprises a server 71, a graphical user interface 72, a patient monitor 73 and a simulation computer 74.

The simulation computer 74 is responsible for the communication of the patient simulator 1 with the graphical user interface 72 and the patient monitor 73, and is preferably integrated in the patient simulator 1. The simulation computer 74 assumes the CPU-intensive processing of the control commands and sensor data acquisition. In doing so, the simulation computer 74 communicates with the components incorporated in the simulator 1 and gathers various sensor data of the simulator 1, processes the same and subsequently generates control signals for controlling, for instance, the servomotors of the simulator 1.

The simulation computer 74 with respect to the lung simulator (FIG. 14) comprises the physiological computation model 65 and the animation controller 68.

The control of the overall simulation system by a trainer is performed via the graphical user interface 72. Said user interface enables the trainer to input the general conditions for the training scenario. In the course of the exercise, the desired pathological changes are controlled there, and the measures taken by the trainee can be visualized to the trainer on the user interface by visualizing the sensor data of the system. To this end, the parameters and the individual functions of the simulator 1, such as respiration and heartbeat, are initially transmitted to the simulation computer 74 before the corresponding control commands for the patient simulator 1 are generated there.

The user interface is preferably subdivided into three zones: 1) the representation of the newborn or the premature baby, including control elements, e.g. for ECG, saturation monitoring and peripheral accesses; 2) the zone for controlling the respiratory functions; and 3) the zone for displaying and controlling the patient monitor 73. In the center of the user interface are the 3D model of the lung and the 3D model of the simulator, each in the current simulation state. The control elements enable the "remote control" of the simulation system via the interlayer of the simulation computer 74. The simulation computer 74 continuously determines the current state in which the simulator 1 is at that very moment and transmits the same to the graphical user interface 72, which precisely reproduces that state on the interface. This enables, for instance, live representations of measures taken by the trainees, e.g. heart pressure massages.

The system comprises a patient monitor 73 for illustrating the simulated vital values of the simulated patient. The adjustable and the measured vital parameters, which are represented in real time on the graphical user interface 72, are transmitted to the patient monitor 73 by the same, preferably in a wireless manner, e.g. via wireless LAN. The physiological data of the simulated patient are thus visualized for the trainees. The realistic representation of these values is of decisive importance to the trainees for decision-making and the initiation of appropriate measures. The monitor comprises a touch screen for its operation such as to quit alarms.

The optional server 71 serves to administer and communicate data relating to the patient monitor 73 and not mapped in the model of the simulator 1.

Figure 16:
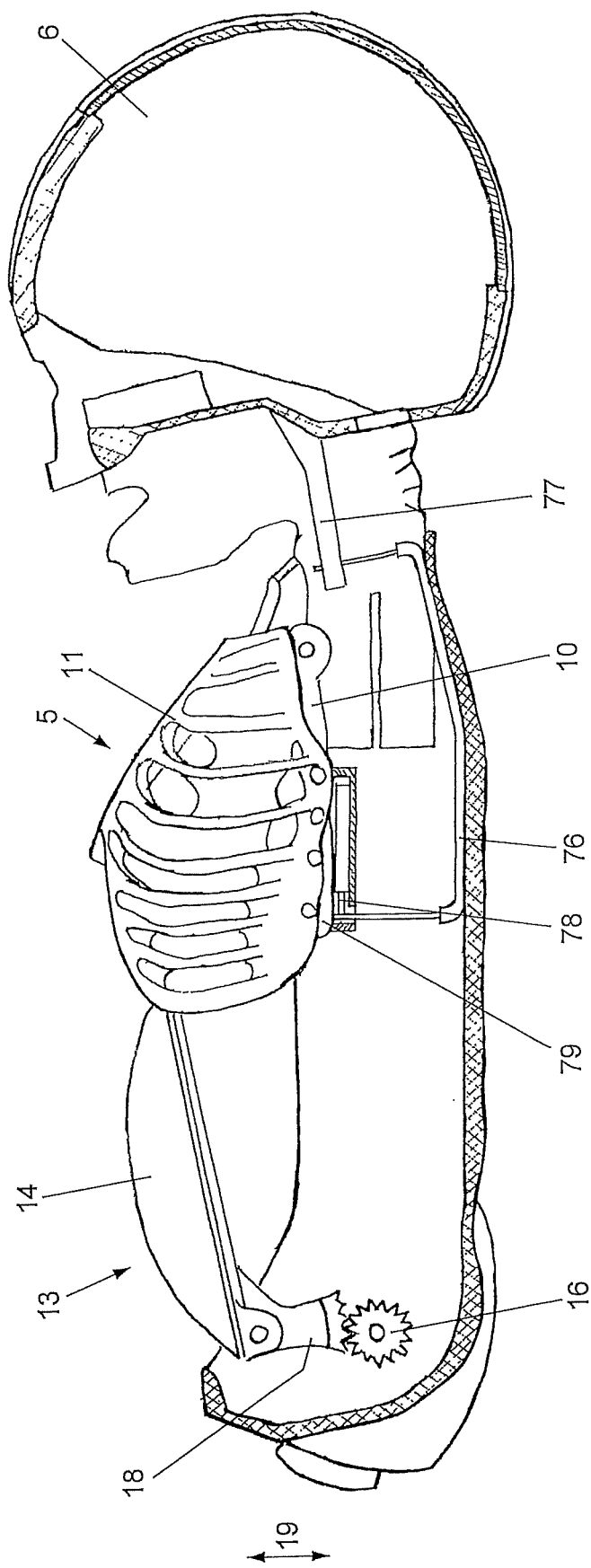
FIG. 16 is a side view of the simulator with a breath-synchronous head movement.
Figure 17:
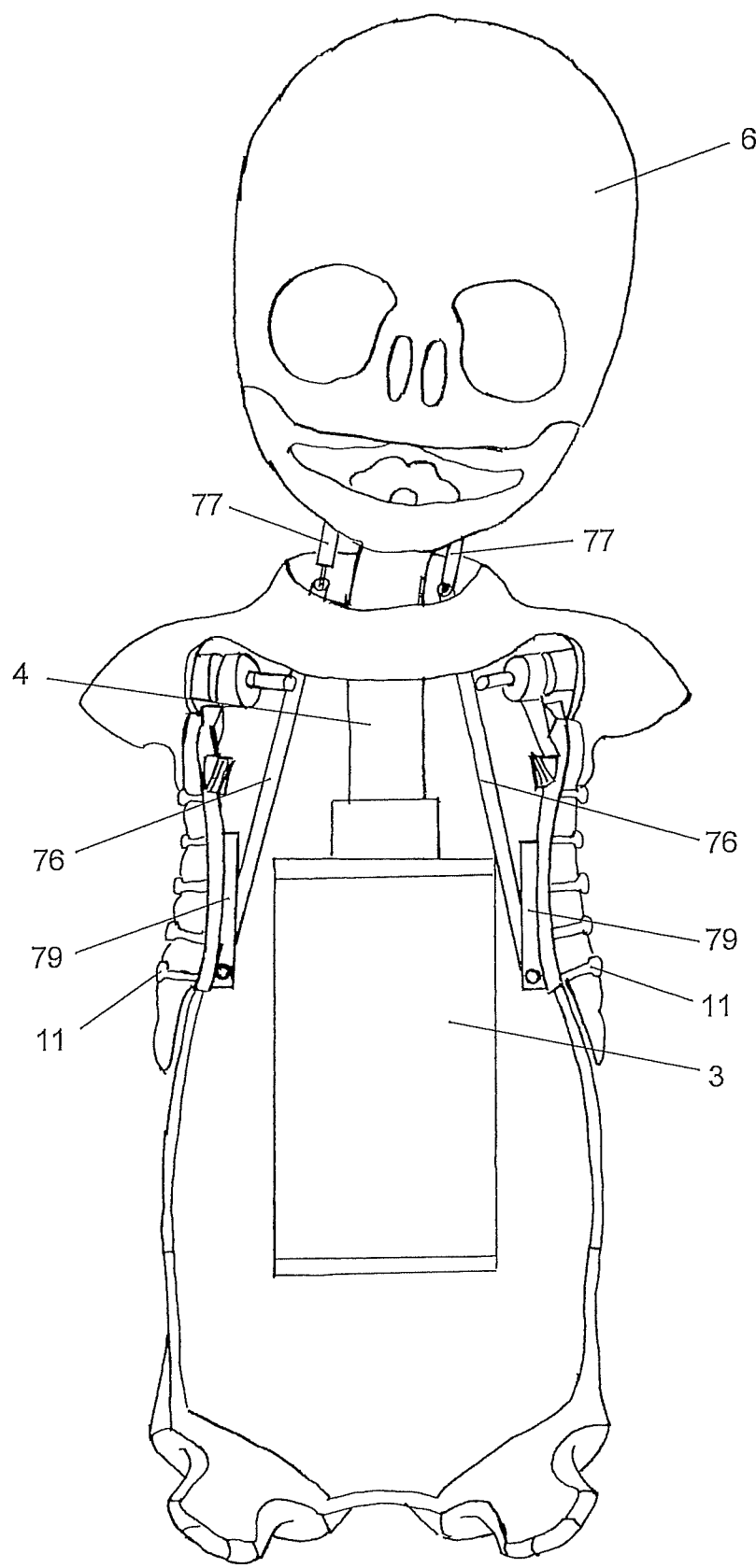
FIG. 17 is a front view of the simulator according to FIG. 16.

FIGS. 16 and 17 depict a side view and a front view, respectively, of the simulator including means for simulating breath-synchronous head movements. FIG. 16 substantially corresponds to the configuration according to FIG. 3, wherein two Bowden cables 76 extending on both sides of the simulated respiratory tract (simulated trachea 4) are additionally provided. The Bowden cables 76, on the one hand, are firmly attached to two levers 77 of the simulated skull 6, in particular to the rear palate roof and, on the other hand, are each connected to the caudal end of the two rib wings 79, the lever arms of the hemithoraces, each via a controllable clamping mechanism 78. Upon activation of the clamping mechanism 78, a tensile-fast connection between the cable of the respective Bowden cable 76 and the rib wings 79 will be established such that the lifting of the rib wing 79 will exert appropriate tension on the cable. The clamping mechanism 78 enables the fixation of the respective Bowden cable 76 during maximum expiration (lowered rib wing 79). By lifting the rib wing 79 upon inspiration, tension is exerted on the cable of the Bowden cable, which causes the head 6 to tilt forward synchronously with the lifting of the breast. The counter-movement is effected by the restoring force of the tensioned silicone components (e.g. silicone skin in the neck region and silicone components of the airway) of the simulator. These elements act like counter-springs.

The separate actuatability of the two clamping mechanisms 78 enables both bending forward upon activation of both clamps 78 and lateral bending upon activation of just one clamp 78.

A further aspect is the time of clamping during the lifting of the rib wing 79, since this will influence the intensity of the head movement. If the clamping mechanism 78 is activated not in the position of maximum expiration, but only after the rib wing 79 has traversed a first partial path, the inclination of the head will occur by a smaller extent. Such options of variation enable the head movement to be variably performed according to a random principle so that said movement corresponds to a more natural movement.

The invention claimed is:

1. A patient simulator, comprising:
    a simulated thorax;
    a lung simulator comprising a control element for adjusting a compliance, a rigid-wall chamber, and a controllable piston defining a chamber volume of the rigid-wall chamber; and
    a simulated anatomical trachea leading to the lung simulator,
    wherein the control element is configured to control the piston, the piston is configured to vary the chamber volume as a function of pressure and time, and the compliance is adjustable by changing a force exerted on the piston;
    wherein the simulated thorax comprises a simulated chest including at least one liftable and lowerable chest element to simulate lifting and lowering of the chest, and wherein the at least one liftable and lowerable chest element cooperates with at least one lifting and lowering mechanism actuatable independently of the lung simulator, the at least one liftable and lowerable chest element configured to be driven by the at least one lifting and lowering mechanism mechanically independent of the lung simulator, such that the lifting and lowering of the simulated chest can be simulated independently of a current status of the lung simulator.

2. The patient simulator according to claim 1, wherein at least one sensor for measuring a state of the lung simulator is provided, signals of the at least one sensor being fed to a control device for actuating a drive of the at least one lifting and lowering mechanism in order to lift and lower the at least one liftable and lowerable chest element as a function of said signals.

3. The patient simulator according to claim 1, wherein at least one right liftable and lowerable chest element for a right hemithorax of the simulated thorax and at least one left liftable and lowerable chest element for a left hemithorax of the simulated thorax are provided, which are configured to be liftable and lowerable separately from each other and each cooperate with a separate, actuatable lifting and lowering mechanism, the lifting and lowering mechanism for the right chest element and the lifting and lowering mechanism for the left chest element being actuatable independently of each other.

4. The patient simulator according to claim 1, wherein the lung simulator further comprises a second control element for adjusting a resistance.

5. The patient simulator according to claim 1, wherein the at least one lifting and lowering mechanism is disposed in the simulated thorax.

6. The patient simulator according to claim 1, wherein a drive element for each of the at least one lifting and lowering mechanism comprises an electromotor drive unit.

7. The patient simulator according to claim 1, wherein a humidity sensor is provided in the simulated thorax, which detects the injection of a fluid such as into at least one of the simulated respiratory tract and the lungs and which cooperates with the lung simulator in such a manner as to change, upon detection of the fluid, at least one of a compliance value of the lung simulator and a resistance value of the lung simulator.

8. The patient simulator according to claim 7, wherein the humidity sensor is disposed on or in a fluid-adsorbing material.

9. The patient simulator according to claim 1, further comprising a simulated head including a simulated skull covered by a simulated skin, wherein at least one light source is disposed at least one of in the simulated skull and on the simulated skull.

10. The patient simulator according to claim 9, wherein the at least one light source is comprised of an RGB LED whose color channels are individually actuatable independently of one another.

11. The patient simulator according to claim 9, wherein a light is disposed on the inner surface of the skull cap of the simulated skull.

12. The patient simulator according to claim 9, wherein a light source is disposed in the simulated skull so as to illuminate a middle cranial fossa from inside.

13. The patient simulator according to claim 9, wherein the simulated skull is made of a polymer material and the simulated skin is one of transparent and translucent.

14. The patient simulator according to claim 9, wherein a light source is connected to an optical fiber extending in an arc-shaped manner in a chin region of the simulated head and arranged to emit light along the arc.

15. The patient simulator according to claim 1, further comprising a simulated head including a simulated nose with two flexible nasal alae, wherein a drive element, which leads into the interior of the simulated head, contacts the nasal alae to simulate widening or narrowing of the nasal alae.

16. The patient simulator according to claim 15, wherein the nasal alae are elastically formed so as to cause the automatic restoration into the starting position upon release of a tension means.

17. The patient simulator according to claim 15, wherein a central control device is provided, which is arranged to actuate the lifting and lowering mechanism of the simulated thorax and to actuate the drive element for the nasal alae such that the widening of the nasal alae and the lifting of the at least one liftable and lowerable chest element occur synchronously.

18. The patient simulator according to claim 1, further comprising:
 a simulated abdomen;
 a stethoscope simulator; and
 an audio generator,
 wherein the simulated thorax and the simulated abdomen comprise at least two distance sensors cooperating with a stethoscope head of the stethoscope simulator for detecting the position of the stethoscope head,
 wherein the detected position data are feedable to the audio generator, and
 wherein the audio generator comprises a memory for audio files and a processing device for mixing the audio files as a function of the position data to a mixed audio signal to be supplied to an earphone of the stethoscope simulator.

19. The patient simulator according to claim 18, wherein for each position on the simulated thorax and on the simulated abdomen at least one audio signal representing sounds of the human body on the respective position is mixable, wherein the sounds, weighted as a function of the position of the stethoscope head, are mixed from at least one stored audio file and emitted in the stethoscope.

20. The patient simulator according to claim 18, wherein the processing device for mixing the audio files is configured such that an audio file is added to the mixed signal at a loudness that is the higher the smaller the distance of the stethoscope head from the position assigned to said audio file.

21. The patient simulator according to claim 18, wherein each audio file with a physiological sound can be replaced by an audio file with a pathological sound, and the latter is mixed for outputting the position-bound audio signal according to the position of the stethoscope head.

22. The patient simulator according to claim 18, wherein at least one of:
 at least one first audio file simulates a heart sound and is assigned to the position of the heart of the simulated thorax;
 at least one second audio file simulates a first lung sound and is assigned to the position of the left lung of the simulated thorax;
 at least one third audio file simulates a second lung sound and is assigned to the position of the right lung of the simulated thorax; and
 at least one fourth audio file simulates an abdominal sound and is assigned to the position of the stomach of the simulated abdomen.

23. The patient simulator according to claim 18, wherein the simulator or the stethoscope comprises a near-field transmitter and the stethoscope or the simulator, respectively, comprises a receiver coil.

24. The patient simulator according to claim 1, further comprising:
a simulated abdomen including a liftable and lowerable abdominal plate driven by a further lifting and lowering mechanism,
wherein a control device is arranged to lift the abdominal plate while, and at the same time, increase a respiratory resistance of the lung model.

25. The patient simulator according to claim 24, wherein the simulated abdomen comprises a light source for illuminating a simulated skin in a stomach region from inside.

26. The patient simulator according to claim 1, further comprising:
a simulated head cooperating with a tilting mechanism for changing an angle between the simulated head and the simulated thorax,
wherein a control device is arranged to drive the tilting mechanism for periodic tilting movements of the simulated head, said period tilting movements being synchronized with the lifting and lowering movements of the chest element.

27. The patient simulator according to claim 1, further comprising:
a simulated head cooperating with a tilting mechanism for changing an angle between the simulated head and the simulated thorax,
wherein a user interface and a monitor display for setting and displaying patient-specific biosignals and respiratory parameters are implemented on two systems.

28. The patient simulator according to claim 1 comprising,
a simulated thorax;
a lung simulator comprising a control element for adjusting a compliance; and
a simulated anatomical trachea leading to the lung simulator,
wherein the simulated thorax comprises a simulated chest including at least one liftable and lowerable chest element to simulate lifting and lowering of the chest,
wherein the at least one liftable and lowerable chest element cooperates with at least one lifting and lowering mechanism actuatable independently of the lung simulator, the at least one liftable and lowerable chest element configured to be driven by the at least one lifting and lowering mechanism mechanically independent of the lung simulator, such that the lifting and lowering of the simulated chest can be simulated independently of a current status of the lung simulator,
wherein the at least one liftable and lowerable chest element comprises a plurality of simulated ribs, and the simulated thorax comprises a simulated skin covering the simulated ribs and being liftable and lowerable together with the at least one liftable and lowerable chest element;
wherein a tension or pressure means contacting the simulated skin is fastened to the at least one liftable and lowerable chest element; and
wherein the at least one liftable and lowerable chest element carries a further drive element for shifting the tension means so as to cause an intercostal retraction of the simulated skin.

* * * * *